United States Patent
Chalawsky et al.

(10) Patent No.: US 10,748,174 B1
(45) Date of Patent: Aug. 18, 2020

(54) FREQUENCY OPTIMIZATION OF ADVERTISEMENT INSERTION IN MEDIA STREAMS

(71) Applicant: Google LLC, Mountain View, CA (US)

(72) Inventors: Matt Chalawsky, Los Angeles, CA (US); Alexandr Y. Smolyanov, Rancho Santa Margarita, CA (US)

(73) Assignee: Google LLC, Mountain View, CA (US)

( * ) Notice: Subject to any disclaimer, the term of this patent is extended or adjusted under 35 U.S.C. 154(b) by 86 days.

(21) Appl. No.: 16/037,002

(22) Filed: Jul. 17, 2018

Related U.S. Application Data

(63) Continuation of application No. 14/076,938, filed on Nov. 11, 2013, now abandoned, which is a continuation of application No. 12/697,154, filed on Jan. 29, 2010, now Pat. No. 8,583,484.

(51) Int. Cl.
*G06Q 30/02* (2012.01)

(52) U.S. Cl.
CPC .............................. *G06Q 30/0244* (2013.01)

(58) Field of Classification Search
CPC ...................................................... G06Q 30/02
See application file for complete search history.

(56) References Cited

U.S. PATENT DOCUMENTS

| | | | |
|---|---|---|---|
| 5,724,521 A | 3/1998 | Dedrick | |
| 5,948,061 A | 9/1999 | Merriman et al. | |
| 6,167,382 A | 12/2000 | Sparks et al. | |
| 6,401,075 B1 | 6/2002 | Mason et al. | |
| 6,985,882 B1 | 1/2006 | Del Soto | |
| 7,086,075 B2 | 8/2006 | Swix et al. | |
| 7,124,091 B1 | 10/2006 | Khoo et al. | |
| 7,860,995 B1 | 12/2010 | Singh | |
| 2001/0020236 A1 | 9/2001 | Cannon | |
| 2003/0171990 A1 | 9/2003 | Rao et al. | |
| 2005/0021395 A1 | 1/2005 | Luu | |
| 2005/0021403 A1 | 1/2005 | Ozer et al. | |
| 2006/0074749 A1 | 4/2006 | Kline et al. | |
| 2006/0271438 A1 | 11/2006 | Shotland et al. | |
| 2007/0143186 A1 | 6/2007 | Apple et al. | |
| 2007/0288350 A1 | 12/2007 | Bykowsky et al. | |
| 2008/0065504 A1 | 3/2008 | Newmark et al. | |

(Continued)

FOREIGN PATENT DOCUMENTS

WO WO 97/21183 6/1997

OTHER PUBLICATIONS

Aaddzz Brokers Web Ad Space Sales Between Advertisers & Publishers, "The Best Way to Buy and Sell Web Advertising Space," 1997. (6 pages) [online] Retrieved from the Internet: <URL:http://www.aaddzz.com>.

(Continued)

*Primary Examiner* — Marilyn G Macasiano
(74) *Attorney, Agent, or Firm* — Fish & Richardson P.C.

(57) ABSTRACT

Methods, systems, and apparatus, including computer programs encoded on a computer storage medium, are described for frequency optimization of advertisement streams. The methods and systems described in this specification may enable determination of an optimal presentation frequency of an ad stream, or a number of times the ad stream is to be broadcast and/or rebroadcast, prior to the audience becoming interested in the ad, or acting on the ad to generate a conversion event.

20 Claims, 12 Drawing Sheets

(56) References Cited

U.S. PATENT DOCUMENTS

| | | | |
|---|---|---|---|
| 2008/0077956 | A1 | 3/2008 | Morrison et al. |
| 2008/0271070 | A1* | 10/2008 | Kanojia ............. G06Q 30/0251 725/32 |
| 2009/0254931 | A1* | 10/2009 | Pizzurro ............ H04N 21/4667 725/5 |

OTHER PUBLICATIONS

Accipiter, Inc., "Accipiter announces Accipiter AdManager, a breakthrough in Internet advertising and marketing" (2 pages) [Online], [retrieved on Apr. 1, 2008]. Retrieved from the Internet <URL:http://web.archive.org/web/19980201092220/www.accipiter.com/press/releases/pr_adman10.htm> Sep. 9, 1996.
Adforce, User Guide Version 2.6, "A Complete Guide to AdForce," 1998 (285 pages).
AdKnowledge Corporate Information, Company Overview, (2 pages) [online retrieved Aug. 16, 2007] Retrieved from <URL:http://web.archive.org/web/19990128143110/www.adknowledge.com/corporate/index.html>.
Adknowledge Customers, i-traffic, [Online], [retrieved Aug. 16, 2007] (2 pages) Retrieved from the Internet: <URLhttp://web.archive.org/web/19990503093107/www.adknowledge.com/aksystem/profile_itraffic.html>.
AdKnowledge Inc., "Automates the targeting and serving of web advertising campaigns," (3 pages), [Online], [retrieved on Aug. 16, 2007] Retrieved from the Internet: <URL:http://web.archive.org/web/19990222023416/www.adknowledge.com/aksystem/smartbanner.html>.
AdKnowledge Inc., "Comprehensive Planning," (3 pages), [Online], [retrieved on Aug. 16, 2007]Retrieved from the Internet: <URL:http://web.archive.org/web/19990221144457/www.adknowledge.com/aksystem/planner.html>.
AdKnowledge Inc., "The AdKnowledge System," (2 pages), [Online], [retrieved on Aug. 16, 2007] Retrieved from the Internet: <URL:http://web.archive.org/web/19990221115917/www.adknowledge.com/aksystem/index.html>.
AdKnowledge Inc., Corporate Information "AdKnowledge Events," (1 page), [Online], [retrieved on Aug. 16, 2007] Retrieved from the Internet: <URL:http://web.archive.org/web/20000511005235/www.adknowledge.com/whatsnew/events.html >.
Adknowledge Primary Services, Customer Reference Guide. pp. 1-90, 2000.
AdKnowledge, Inc., Campaign Manager, "Streamlines buying and trafficking while saving time and money," (3 pages), [Online], [retrieved Aug. 16, 2007] Retrieved from the internet: <URL:http://web.archive.org/web/19990221080152/www.adknowledge.com/aksystem/campaign.html>.
ADWIZ by NEC, "The Artificial Intelligence Solution for Advertisement Targeting," (1 page), [Online], [retrieved Apr. 1, 2008] Retrieved from the Internet: <URL:http://web.archive.org/web/20000816042946/http://www.ccrl.com/adwiz/>.
Blinkx, "Video Search Engine—Blinkx," (1 page), [Online], [retrieved Apr. 16, 2008]. Retrieved from the Internet: <URL:http://blinkx.com/>.
Engage Technologies, Accipiter, "AdManager Frequently Asked Questions." (3 pages), [Online], [retrieved Apr. 1, 2008]. Retrieved from the Internet <URL:http://web.archive.org/web/19990208222457/www.accipiter.com/products/admanager/adm_faq.htm> Feb. 8, 1999.
Engage Technologies, Accipiter, "Questions and Answers about using Accipiter AdManager with Engage Precision Profiles" (3 pages), [Online], [retrieved on Apr. 1, 2008]. Retrieved from the Internet <URL:http://web.archive.org/web/19990209022600/www.accipiter.com/products/admanager/adm_profilesfaq.htm> Feb. 9, 1999.
EveryZing, Inc., "Video SEO and Multimedia Search Solutions," (3 pages), [Online], [retrieved Apr. 16, 2008], Retrieved from the Internet: <URL:http://everyzing.com/>.

Hong, Kee Wan, Authorized Officer, Korean Intellectual Property Office, PCT Application No. PCT/US2008/068406, filed Jun. 26, 2008, in International Search Report, dated Jan. 9, 2009, 11 pages.
IEEE Intelligent Systems, New Products, "Tell your computer where to go," (4 pages), United Kingdom, Jan./Feb. 1998.
Information Access Technologies, Inc., "Aaddzz Ad Sizes," (2 pages), [Online], [retrieved Apr. 15, 2008] Retrieved from the Internet: <URL:http://web.archive.org/web/19980130092848/www.aaddzz.com/pages/sizes>.
Information Access Technologies, Inc., Aaddzz Ads, Spaces, & Places (2 pages), [Online], [retrieved Apr. 14, 2008] Retrieved from the Internet: <URL:http://web.archive.org/web/19980130092810/www.aaddzz.com/pages/b-adspacesplaces>.
Information Access Technologies, Inc., "Aaddzz Advanced Topics," (4 pages), [Online], [retrieved Apr. 15, 2008] Retrieved from the Internet: <URL:http://web.archive.org/web/19980130092908/www.aaddzz.com/pages/advanced>.
Information Access Technologies, Inc., "Aaddzz Advertisers," (4 pages), [Online], [retrieved Apr. 15, 2008] Retrieved from the Internet: <URL:http://web.archive.org/web/19980130092804/www.aaddzz.com/pages/b-advertise>.
Information Access Technologies, Inc., "Aaddzz Buying Ad Space with Aaddzz," (5 pages), [Online], [retrieved Apr. 15, 2008] Retrieved from the Internet: <URL:http://web.archive.org/web/19980130092822/www.aaddzz.com/pages/advertising>.
Information Access Technologies, Inc., "Aaddzz Fees and Payments," (3 pages), [Online], [retrieved Apr. 15, 2008] Retrieved from the Internet: <URL:http://web.archive.org/web/19980130092836/www.aaddzz.com/pages/pricing>.
Information Access Technologies, Inc., "Aaddzz Free Access Reports," (2 pages), [Online], [retrieved Apr. 15, 2008] Retrieved from the Internet: <URL:http://web.archive.org/web/19980130092902/www.aaddzz.com/pages/reports>.
Information Access Technologies, Inc., "Aaddzz Frequently Asked Questions," (4 pages), [Online], [retrieved Apr. 15, 2008] Retrieved from the Internet: <URL:http://web.archive.org/web/19980130092914/www.aaddzz.com/pages/faq>.
Information Access Technologies, Inc., "Aaddzz Home Page," (2 pages), [Online], [retrieved Apr. 15, 2008] Retrieved from the Internet: <URL:http://www.aaddzz.com/letter.html>.
Information Access Technologies, Inc., "Aaddzz Publishers," (2 pages), [Online], [retrieved Apr. 15, 2008] Retrieved from the Internet: <URL:http://web.archive.org/web/19980130092758/www.aaddzz.com/pages/b-publish>.
Information Access Technologies, Inc., "Aaddzz Ratings," (3 pages), [Online], [retrieved Apr. 15, 2008] Retrieved from the Internet: <URL:http://web.archive.org/web/19980130092842/www.aaddzz.com/pages/ratings>.
Information Access Technologies, Inc., "Aaddzz Real-Time Reporting & Statements," (2 pages), [Online], [retrieved Apr. 15, 2008] Retrieved from the Internet: <URL:http://web.archive.org/web/19980130092816/www.aaddzz.com/pages/b-realtime>.
Information Access Technologies, Inc., "Aaddzz Selling Ad Space With Aaddzz," (5 pages), [Online], [retrieved Apr. 15, 2008] Retrieved from the Internet: <URL:http://web.archive.org/web/19980130092829/www.aaddzz.com/pages/selling>.
Information Access Technologies, Inc., "Introduction to Aaddzz," (2 pages), [Online], [retrieved Apr. 15, 2008] Retrieved from the Internet: <URL:http://web.archive.org/web/19980130092752/www.aaddzz.com/pages/b-intro>.
Information Access Technologies, Inc., Aaddzz Highlights: The Maximum Performance Ad Network, "Aaddzz brokers Web ad space between advertisers & publishers," 1997 (2 pages), [Online], [retrieved Apr. 15, 2008] Retrieved from the Internet: <URL:http://web.archive.org/web/19980130092746/www.aaddzz.com/pages/b-highlights>.
Inside Online Video, "Blinkx to Contextualize Video Ads Through Speech Recognition," Jun. 22, 2007 (2 pages), [Online], [retrieved Apr. 16, 2008] Retrieved from the Internet: <URL:http://www.insideonlinevideo.com/20007/06/22/blinkx-to-contextualize-video-ads-through-speech-recognition/>.
Langheinrich, M., et al., "Unintrusive Customization Techniques for Web Advertising" NEC Corporation, C&C Media Research Labo-

(56) References Cited

OTHER PUBLICATIONS ratories. Japan (12 pages), [Online], [retrieved on Apr. 1, 2008]. Retrieved from the Internet <URL:http://web.archive.org/web/20000819020800/www.ccrl.com/adwiz/adwiz-www8.html>.

NEC Corporation, "ADWIZ Intelligent Advertisement Targeting," (1 page).

NEC Corporation, ADWIZ White Paper, "Taking Online Ad Targeting to the Next Level," (5 pages), [Online], [retrieved on Apr. 15, 2008] Retrieved from the Internet: <URL:http://web.archive.org/web/20010619222015/www.ccrl.com/adwiz/whitepaper.html>.

NEC Corporation, NEC: Press Release "NEC announces ADWIZ, an Artificial Intelligence Solution for Advertisement Targeting Software on the World Wide Web," (3 pages) Jan. 8, 1999.

ScanScout, "ScanScout in the News," [Online], [retrieved Apr. 16, 2008]. Retrieved from the Internet: URL:http://scanscout.com/ (1 page).

Zeff, R. and Aronson, B., "*Advertising on the Internet*," second edition, pp. 1-436 (1999).

\* cited by examiner

| Impressions-before-action* distribution for | Units | Counts | Action | Optionally grouped by |
|---|---|---|---|---|
| ad stream | audience members | ones, tens, hundreds, etc. | click, conversion | publisher, daytime, genre, etc. |
| audience member | ad streams | | | |

\* impressions before action =

*impressions* of ad stream *before* audience member has taken *action* in response to a call-to-action delivered by ad stream

FIG. 5A

FREQUENCY OPTIMIZATION OF ADVERTISEMENT INSERTION IN MEDIA STREAMS

CROSS-REFERENCE TO RELATED APPLICATION

This application is a continuation application of U.S. application Ser. No. 14/076,938, filed Nov. 11, 2013, which is a continuation application of U.S. application Ser. No. 12/697,154, filed Jan. 29, 2010, all of which are incorporated by reference.

BACKGROUND

This specification relates to frequency optimization of online advertisements inserted into media streams.

In some instances, online advertisements are inserted into audio or video streams based on a schedule configured to provide the highest effectiveness for the advertised message. An ad stream is considered effective if listeners or viewers of the ad stream express interest in the product or service presented by the inserted ad stream. In general, online ads that are expected to generate most interest from an audience member should be scheduled for insertion in the media stream, to ensure the largest revenue for the ad publisher.

Multiple factors such as a geographic location and audience demographics of a publisher, time of day, season, and the like can influence the effectiveness of ad streams inserted by the publisher in available ad slots of the media stream. As such, the foregoing factors can be used to guide reserving of and bidding for available ad slots to generate an ad insertion schedule that would optimize the effectiveness of the ad streams inserted by the publisher into the media stream.

SUMMARY

In addition to the factors that can influence the effectiveness of online ads enumerated above, frequency of the ad insertion may also determine the ad effectiveness. The methods and systems described in this specification enable tracking the number of impressions prior to recording corresponding events indicative of interest for ads inserted into a media stream. Examples of events indicative of interest for an ad stream can be clicks on a clickable companion element of the ad stream, visits to web sites having links presented as part of the ad stream content, requests for receiving more information on or purchases of the advertised product or service, etc. The impressions of ad streams can be tracked via feedback mechanisms corresponding to ad insertion (e.g., cookies, etc.,) while the interest-indicative events can be tracked via feedback mechanisms for detecting the actions taken by the audience (e.g., clickable companion elements of ad streams.) The tracked information can be used to determine a frequency targeting/capping (FTC), i.e., the number of times an audience hears or views an ad stream (on the average) before a call-to-action delivered by the presented ad stream becomes effective for the audience.

The FTC established based on the systems and methods disclosed in this specification can be used along with a multitude of other factors to optimize the effectiveness of ad streams inserted into media streams. For example, an FTC specific to a particular audience member can be established and subsequently used along with the particular audience member's profile and other factors to effectively schedule presentations of personalized ad streams for this particular audience member. In another example, an FTC specific to a particular ad can be established and then used along with other factors to effectively schedule insertions of this particular ad in media stream broadcasts to multiple audience members.

One aspect of the subject matter described in this specification can be implemented as a system including a publisher computer system configured to stream a media stream to a client computer. The system further includes a hub computer system communicatively coupled with the publisher computer system and the client computer. The hub computer system is configured to instruct the publisher computer system to switch from streaming the media stream to streaming an ad stream to the client computer. The ad stream includes a call-to-action for an audience member associated with the client computer. The streaming of the media stream is resumed after the presentation of the ad stream. The hub computer system is further configured to monitor, during the streaming of the ad stream by the publisher computer system, for an indication of an action taken by the audience member associated with the client computer in response to the call-to-action. Upon resuming the streaming of the media stream by the publisher computer system to the client computer, the hub computer system is configured to update a profile of the ad stream. The profile represents a presentation effectiveness of the ad stream. The updating of the profile includes incrementing an impression count, and if the monitoring has detected the action indication, the hub computer system is configured to augment the profile with information included in the detected action indication. The hub computer system is further configured to schedule future presentations of the ad stream based at least in part on the updated profile.

Implementations can include any, all, or none of the following features. The media stream can include an online radio audio stream and the ad stream can include an audio ad. The media stream can include a video stream and the ad stream can include a video ad. The hub computer system is configured instruct the client computer to present a companion element of the ad stream on the client computer during the streaming of the ad stream by the publisher computer system. The companion element can include a text element. The companion element can also include a banner. The ad stream and the companion element can consist of a clickable video stream. The type of programming can include the genre of music of a radio stream.

In some implementations, to perform the updating of the ad stream profile, the hub computer system can be further configured to aggregate the information included in the received action indication with information relating to previous presentations of the ad stream by a plurality of publishers to an audience monitored by the hub computer system. An optimal frequency-to-action can be reevaluated as a number of impressions of the ad stream that caused a maximum number of members of the monitored audience to respond to the call-to-action of the ad stream. To perform the updating of the ad stream profile, the hub computer system can be further configured to aggregate the information included in the received action indication with information relating to previous presentations of the ad stream by a publisher associated with the publisher computer system to an audience of the publisher that can be monitored by the hub computer system. An optimal frequency-to-action can be reevaluated as a number of impressions of the ad stream that caused a maximum number of members of the monitored audience to respond to the call-to-action of the ad stream. To perform the reevaluating of the optimal frequency-to-action, the hub computer system can be further configured to re-determine the optimal frequency-to-action for each one of: a type of programming corresponding to media streams switched by the ad stream. The type of programming can include a genre of music of a radio stream; and a time of day, a day of a week, and a month.

In a second aspect, a computer storage medium encoded with a computer program. The program includes instructions that when executed by data processing apparatus cause the data processing apparatus to stream a media stream to a client computer. The apparatus further includes instructions for switching from streaming the media stream to streaming an ad stream to the client computer. The ad stream includes a call-to-action for an audience of the ad stream. The streaming of the media stream is resumed after the presentation of the ad stream. The apparatus further includes instructions for monitoring, while streaming the ad stream, for an indication of an action taken by an audience member associated with the client computer in response to the call-to-action. The apparatus further includes instructions for updating, upon resuming the streaming of the media stream to the client computer, an optimal frequency-to-action for the audience member as a number of impressions after which the audience member responded to each of a maximum number of ad streams from among previously presented ad streams. The updating of the optimal frequency-to-action includes incrementing an impression count of the ad stream, and if the monitoring has detected the action indication, augmenting the optimal frequency-to-action with information included in the detected action indication. The apparatus further includes instructions for scheduling future ad stream presentations for the audience member based at least in part on the updated optimal frequency-to-action.

Implementations can include any, all, or none of the following features. While streaming the ad stream, the instructions cause the plurality of data processing apparatuses to instruct the client computer to present a companion element of the ad stream on the client computer during the streaming of the ad stream. The call-to-action can include one or more of: a prompt for the audience member to click on the companion element of the ad stream for obtaining additional information about a product described in the ad stream, and a prompt for the audience member to acquire the product described in the ad stream. The information included in the detected action indication can include at least one of: (i) an indication of the audience member having clicked on the companion element of the ad stream, and (ii) an indication of the audience member having acquired a product described in the ad stream, and (iii) one or more of: (iii.1) a publisher ID, an audience member ID, and a client computer ID, (iii.2) a time of day, a day of a week, and a month of the streaming of the ad stream, and (iii.3) a type of programming associated with the media stream switched by the ad stream. The type of programming can include the genre of music of a radio stream.

In some implementations, the instructions causing the updating of the optimal frequency-to-action for the audience member can include aggregating the information included in the received action indication with information relating to previous presentations of ad streams to the audience member by a plurality of publishers. The instructions causing the updating of the optimal frequency-to-action for the audience member can further include aggregating the information included in the received action indication with information relating to previous presentations of ad streams to the audience member by a publisher. The instructions causing the updating of the optimal frequency-to-action for the audience member can include re-determining the optimal frequency-to-action for each one of: a type of programming corresponding to media streams switched by ad streams. The type of programming can include a genre of music of a radio stream; and a time of day, a day of a week, and a month.

In a third aspect, a method performed by data processing apparatus includes inserting an ad stream into media streams being streamed to client computers. The ad stream includes a call-to-action for an audience associated with the client computers. The method further includes determining a distribution of impressions-before-action for the ad stream based on said inserting. An impression includes one presentation of the ad stream to one of the client computers. An action corresponds to an interaction of an audience member with the one of the client computers in response to the call-to-action. The impressions-before-action distribution includes a first count of audience members who responded to the call-to-action after one impression of the ad, a second count of audience members who responded to the call-to-action after two impressions of the ad, and so on. The method further includes scheduling one or more impressions for future presentations of the ad stream, such that if the determined impressions-before-action distribution includes decreasing counts, a scheduled number of impressions is smaller than a predetermined number of impressions. If, however, a maximum count of the determined impressions-before-action distribution corresponds to audience members who responded to the call-to-action after a particular number of impressions of the ad, where the particular number is larger than 1, a scheduled number of impressions is larger than or equal to a minimum number of impressions and smaller than or equal to a predetermined number of impressions. The minimum number is smaller than or equal to the particular number, and the predetermined number is larger than or equal to the particular number.

Implementations can include any, all, or none of the following features. The call-to-action can include at least one of (i) a prompt for the audience member to click on a companion element of the ad stream for obtaining additional information about a product described in the ad stream, and (ii) a prompt for the audience member to acquire a product described in the ad stream. The interaction can include at least one of (i) the audience member having clicked on the companion element of the ad stream, and (ii) the audience member having acquired the product described in the ad stream. The method can further include estimating, from the determined impressions-before-action distribution, a number of impressions-before-action corresponding to a fraction of the audience targeted to respond to the call-to-action, and setting the predetermined number to equal the estimated number. The fraction of the audience targeted to respond to the call-to-action can be 90%.

If the determined impressions-before-action distribution for the ad stream is of type-(i), the scheduling of the one or more impressions for future presentations of the ad stream can include bidding a high price-per-spot for a first impression of the ad stream. The method can include bidding respectively decreasing prices-per-spot subsequent to detecting the first impression of the ad stream. Alternatively, the scheduling of the one or more impressions for future presentations of the ad stream can include reserving two or more spots for presenting the ad stream. In this case, the method can include changing a status of one or more reserved spots to preemptable spots subsequent to detecting a first impression of the ad stream.

If the determined impressions-before-action distribution for the ad stream is of type-(ii), the scheduling of the one or more impressions for future presentations of the ad stream can include setting the minimum number of impressions to equal the particular number. Additionally, the scheduling of one or more impressions for future presentations of the ad stream can include bidding high prices-per-spot for impressions of the ad stream up to the minimum number of impressions, and bidding respectively decreasing prices-per-spot for subsequent impressions of the ad stream. Alternatively, the scheduling of one or more impressions for future presentations of the ad stream can include reserving more spots than the minimum number of impressions for presenting the ad stream. In this case, the method can include changing a status of remaining reserved spots to preemptable spots subsequent to the minimum number of impressions of the ad stream.

In a fourth aspect, a method performed by data processing apparatus includes inserting ad streams into media streams being streamed to a client computer. The ad streams include respective calls-to-action for an audience member associated with the client computer. The method further includes determining a distribution of impressions-before-action for the audience member based on said inserting. An impression includes one presentation of an ad stream to the audience member. An action corresponds to an interaction of the audience member with the client computer in response to a call-to-action included in the ad stream. The impressions-before-action distribution includes a first count of ad streams to which the audience member responded after one impression of each among the first count of ad streams, a second count of ad streams to which the audience member responded after two impressions of each of the second count of ad streams, and so on. The method further includes scheduling one or more impressions for future presentations to the audience member of a given ad stream, such that if the determined impressions-before-action distribution includes decreasing counts, a scheduled number of impressions of the given ad stream is smaller than a predetermined number of impressions. If, however, a maximum count of the determined impressions-before-action distribution corresponds to ad streams to which the audience member responded after a particular number of impressions of the respective ad streams, where the particular number is larger than 1, a scheduled number of impressions of the given ad stream is larger than or equal to a minimum number of impressions and smaller than or equal to a predetermined number of impressions. The minimum number is smaller than or equal to the particular number, and the predetermined number is larger than or equal to the particular number.

Particular implementations of the subject matter described in this specification can be implemented so as to realize one or more of the following potential advantages. The methods and systems disclosed in this specification can enable an advertiser to generate and continuously update an optimal FTC and a model for predicting effectiveness for each newly created ad stream. The generated optimal FTC and the associated predictive model for the ad stream can be added, along with other factors, to the ad profile and can be used by online publishers to deliver effective advertisement streams. Additionally, an online publisher can create and upkeep an optimal FTC and a corresponding predictive model of advertising effectiveness for each audience member. The personalized FTC and predictive model corresponding to the audience member can be added along with other factors to the respective audience member profile and can be used by on-demand online media providers to deliver effective personalized advertisements.

Frequency capping has been used for publishing online advertisements, e.g., at the request of advertisers which can specify that a publisher may not play an ad more than, say, once per hour per audience member. While it was believed that setting up such caps may reduce the possibility of annoying audience members, such randomly imposed caps cannot in general enhance the effectiveness of ad scheduling. Additionally, a global ("ad independent") magic frequency can be used for optimizing the efficiency of an ad broadcasted by an over-the-air radio or TV publisher. The magic frequency may be, e.g., 3-7 impressions per broadcasts per audience member. The above magic figure is used globally for over-the-air radio and TV advertising because, without a specific feedback mechanism to determine the effective frequency of an advertisement broadcast for a specific audience member, a particular way to adjust or optimize such broadcast frequency exists neither for a given ad nor for a specific audience member. Further, over-the-air broadcast of radio or TV ads provides no feedback mechanism to indicate how many times an audience member has heard/viewed a certain advertisement, even when the above-mentioned magic delivery frequency for playing the certain advertisement is being applied. A number of such impressions can only be estimated. This uncertainty can be avoided by the disclosed method and system, by using a companion element of an advertisement and a cookie. The total number of plays of the advertisement, the number of plays preceding the audience member's click on the companion element, and/or the number of plays necessary for the audience member to become interested in the ad stream can be determined accurately via a cookie resident at a client computer. Additionally, the disclosed methods allow for determining whether an audience member acts on the message of the ad stream, or causes a conversion event prior to a scheduled number of times that was predicted to cause the audience member to express interest in the ad message.

Another benefit of the system and methods described in this specification is that one can determine an optimal presentation frequency of an ad stream, or a number of times the ad stream is to be broadcast and/or rebroadcast, prior to the audience becoming interested in, or respectively acting on the ad to generate a conversion event. During the conversion event, an audience member may visit the advertiser's site after clicking on a companion element of the ad stream. A purchase may result during a first visit of the audience member to the advertiser's site following the first click event. However, the audience member's initial visit to the advertiser's site can result in no purchase. Moreover, if the publisher continues to reinsert/present the advertisement stream for a given number of times after the first click event and associated initial web site visit, the audience member may become interested again in the advertisement message, and click for a second time on the companion element of the ad stream with a purchase resulting during the audience member's subsequent visit(s) to the advertiser's site.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 5A, 5B and 5C show example distributions of impressions of an ad stream before an audience member has taken action in response to a message delivered by the ad stream.

Like reference numbers and designations in the various drawings indicate like elements.

DETAILED DESCRIPTION

An advertiser can design an advertising campaign to deliver a message about a new and exciting product to a targeted audience. The advertiser may target, for example, listeners of online radio or viewers of online TV. To effectively reach its targeted online audience, the advertiser may choose to deliver the advertising message to an audience member via an internet-based provider of advertising services that can select, on behalf of the advertiser, a media streaming publisher to present the advertiser's ad campaigns.

Figure 1A:
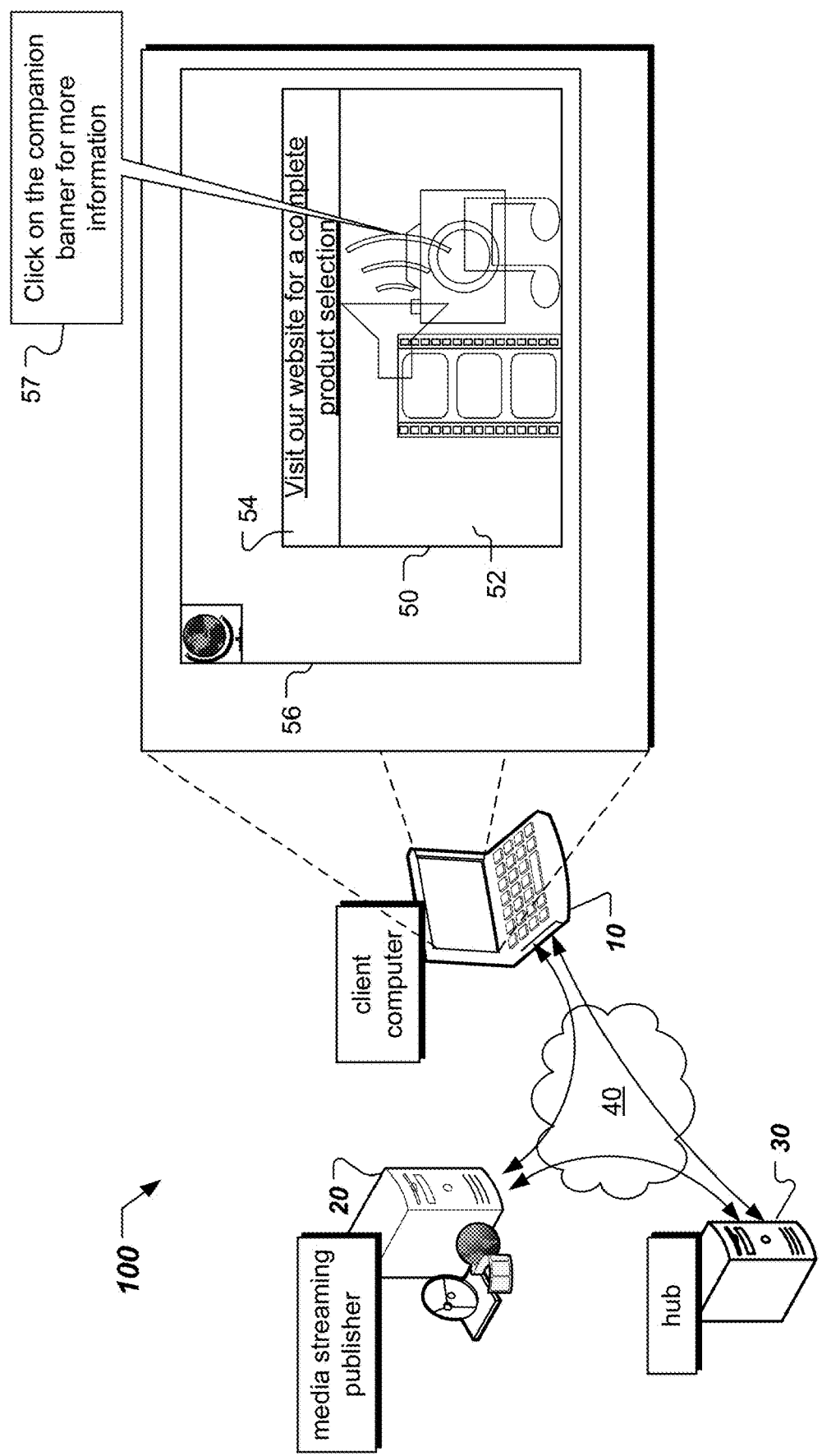
FIGS. 1A and 1B show conceptual diagrams of an example system for presenting advertisement streams.

FIG. 1A shows a conceptual diagram of an example system 100 for presenting advertisement streams. An audience member can use a client computer 10 to run a media player 50 for playing online media content that is streamed via the Internet 40 from a media publisher associated with a media streaming server computer 20. The media player 50 can include a viewer panel 52 and an additional panel 54 for presenting a companion element of the ad stream that is being rendered in the viewer panel 52. For example, the companion element may be a banner displayed in a banner-panel 54. The media streaming server computer 20 is configured to stream media streams requested by the client computer 10. A multitude of media can be streamed over the internet-based communication links, such as text, pictures, music, video, live TV and multimedia.

A hub computer system 30 associated with the internet-based provider of advertising services can be communicatively coupled via the Internet 40 with the publisher computer system 20 and with the client computer 10. The hub computer system 30 is configured to instruct the publisher computer system 20 to insert ad streams for presentation to the client computer 10 during respective advertising slots of the media streams. Radio or TV ad streams presented to the client computer 10 are disruptive in nature, i.e., the underlying programming, show, movie, is interrupted by the presentation of the ad stream. In contrast, an advertisement that is not disruptive can be ignored by the listener or viewer. An example of a non-disruptive ad is a banner presented while the audio or video is streamed to the player. The audience member can choose to ignore the presented banner.

Media players 50 are configured to present a companion element 54 along with the content of the ad stream 52. The companion element 54 can be clicked by audience members interested in following up on information provided during the ad stream presentation. The ad stream presented to the client computer 10 can also include a call-to-action 57 for prompting the audience member to click on the companion element of the ad stream to obtain additional information about a product or service described in the ad stream. Additionally, the call-to-action 57 can be a prompt for the audience member to acquire the product described in the ad stream. To follow up for additional information or to purchase the advertised product the audience member can access, e.g., the advertiser's web site either in a browser included in the media player 50 or in another browser 56 running on the client computer 10. The hub computer system 30 is configured to track the ad stream impressions and the action-event (i.e., clicking on a banner 54 or purchasing the product from a web site 56 by the audience member 10.) The tracked information can be then used for optimizing delivery of advertisement streams. For example, the publisher 20 and/or the advertiser can learn how many times an audience member listens to or views an ad stream before the audience member clicks on the companion banner of the ad stream.

Figure 1B:
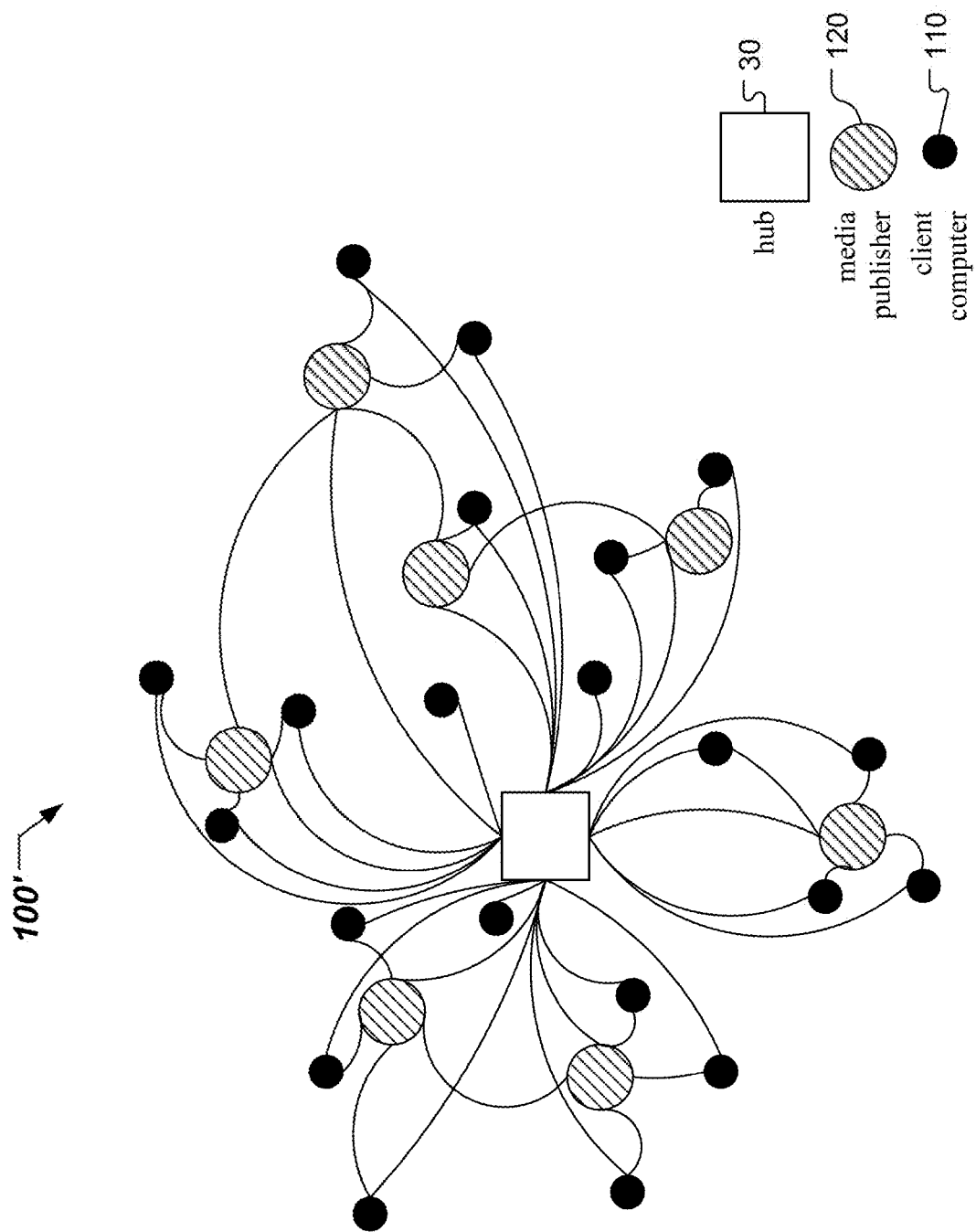

As illustrated in FIG. 1B, the hub computer system 30 can communicate with a plurality of online content publishers 120 to optimize presentation of ad streams to client computers 110 associated with audiences of the plurality of content publishers 120.

For example, the publishing content may be radio content, such as music, or sports, and the publishers 120 may be an internet-radio stations. Radio content can be presented by an internet-radio station via internet streaming in a broadcast manner (the same radio content is presented simultaneously to many audience members 110) or in a personalized manner (different radio content is sent to each consumer according to a consumer's preferences). In some implementations, presenting audio ads by the internet-radio stations 120 can be achieved using equipment configured to stream the audio content of the ad accompanied by text and or images. In other implementations, presenting the audio ads by the internet-radio stations 120 can require equipment further configured to stream video content. Furthermore, in one aspect, the audio ads can be presented in a streaming broadcast manner, i.e., all listeners 110 of the internet-radio station may receive the same ad at a particular time. In another aspect, each listener of the internet-radio station may receive personalized ads based on, for example, a listener's profile.

In another example, the publishing content may be live TV content, such as shows or live sports events, and the publishers 120 may be an internet-TV station. In some implementations, presenting ads by the internet-TV stations 120 can be achieved using equipment configured to stream the audio and video content of the ad. Furthermore, in one aspect, the ads can be presented in a streaming broadcast manner, i.e., all viewers 110 of the internet-TV station may receive the same ad at a particular time. In another aspect, each viewer of the internet-TV station may receive personalized ads based on, for example, a viewer's profile.

The hub computer system 30 is configured to monitor impressions of the ad streams across the monitored audience 110, and to detect indications of action taken by audience members in response to the respective calls-to-action of the presented ad streams. The information included in a detected action indication can include evidence of an audience member having clicked on the companion element of an ad stream. Further, the information can contain an indication of the audience member having acquired a product described in the ad stream. In addition, the information included in the detected action indication can include one or more of (i) a publisher ID, an audience member ID, and a client computer ID; (ii) a time of day, a day of a week, and a month of the streaming of the ad stream; and (iii) a type of programming associated with the media stream switched by the ad stream. For example, the type of programming includes a genre of music of a radio stream, and a talk show or a documentary for a TV stream, etc.

Frequency targeting/capping can be used for scheduling over-the-air radio and TV advertising, as well as for scheduling online ads. An audience member may experience an ad a certain number of times before a call-to-action delivered by the ad may become effective, e.g., causing the audience member to follow up for more information about, or to purchase the advertised product or service. However, presenting the ad too many times may be less effective, e.g., the ad may become annoying to the audience member. In the case of over-the-air radio and TV ad broadcasts, there is no direct feedback mechanism to determine if a specific audience member has heard/viewed the ad or not. Accordingly, the frequency targeting/capping, or the number of times a publisher may play an ad for reaching optimal advertising effectiveness can only be estimated. In the case of banner-based online advertising, the number of times the ad is presented to the audience member (the number of impressions) can be tracked, but no feedback exists to determine that the banner/text ad has been seen.

The systems and methods disclosed in this specification can use a cookie placed on a client computer 10 to track which ad streams have been heard/seen by an audience member associated with the client computer 10 before the audience member has decided to act in response to the ad stream presentations. A cookie can contain text identifying the audience member and/or the client computer 10. The above information included in the cookie can be relayed from the client computer 10 to the hub computer system 30, for example, in a message confirming an impression of the ad stream. The tracked information can be used by the hub computer system 30 to limit repeat plays of ads, for instance.

The methods disclosed in this specification can be implemented by the hub computer server 30 to determine an optimal frequency to a click-event (FTC) for a given ad, for a given audience member, and for a given publisher. Further, the hub computer system 30 can repeatedly re-estimate the determined optimal FTC and update a corresponding profile for the given ad stream or for the given audience member as described below in connection with FIGS. 2A-2B. Examples of optimal FTC that can be determined through the use of systems 100 and 100' in terms of the foregoing and additional characteristics are (i) an FTC corresponding to an ad stream (or an audience member) for a given genre of music, (ii) an FTC corresponding to a given ad stream on a specific genre or publisher channel, (iii) an FTC corresponding to a given publisher channel during a specific time of day, etc.

Figure 2A:
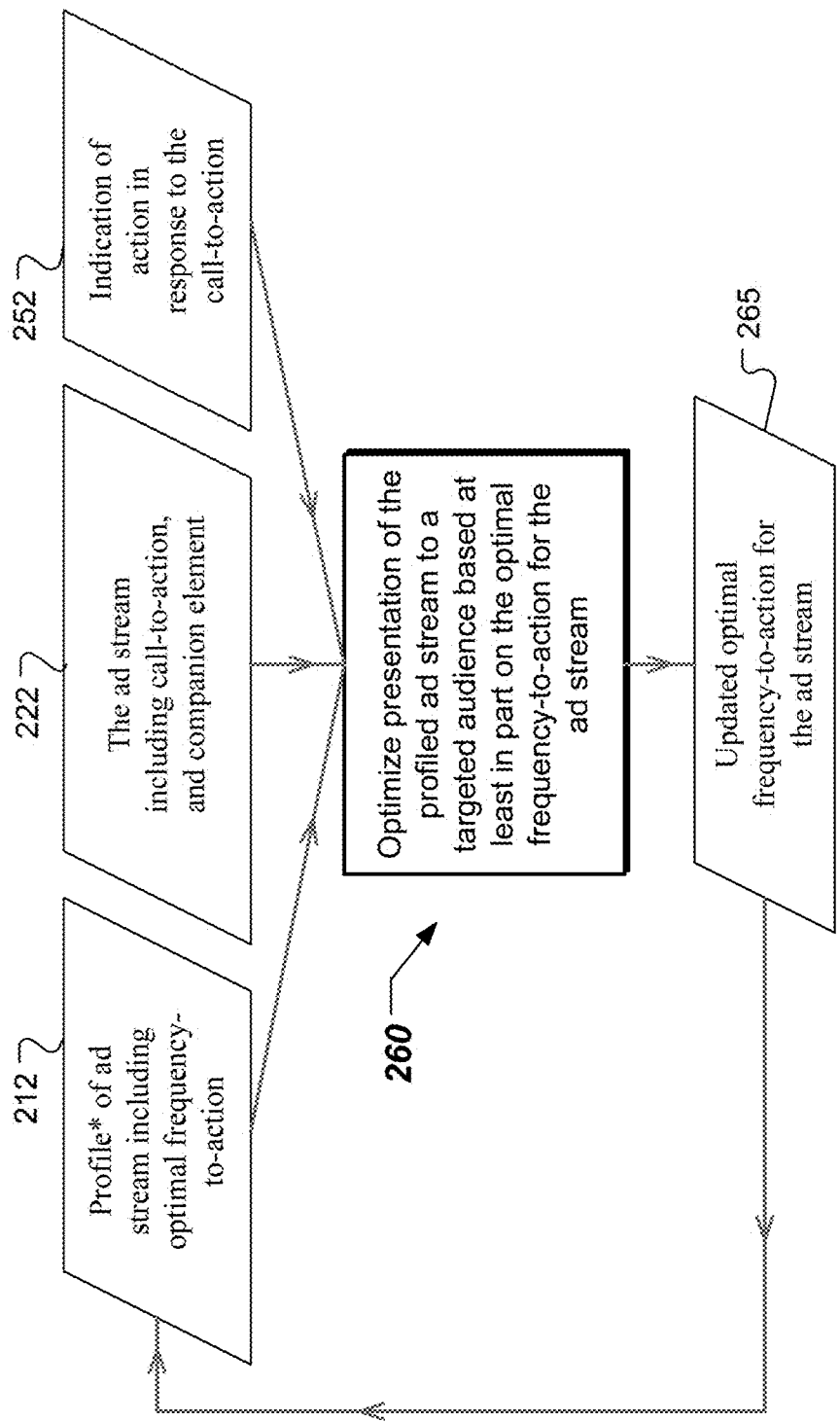
FIG. 2A shows a diagram of a process for optimizing presentation of a profiled ad stream to a targeted audience.

FIG. 2A shows a diagram of a process for optimizing presentation of a profiled ad stream to a targeted audience. The process 260 can be implemented, for example, by the hub computer system 30 of the internet-based provider of advertising services. The inputs of process 260 can be a profile of an ad stream 212 including an optimal frequency-to-action for the ad stream, the ad stream including a call-to-action and a companion element 222, and an indication of action in response to the call-to-action 252. The inputs 212 and 222 can be maintained by and/or can be stored at the hub computer system 30, and the input 252 can be received from client computers 110 associated with audience members of the plurality of publishers 120 monitored by the hub computer system 30.

The process 260 can be implemented to use the received inputs 212, 222 and 252 to optimize presentation of the profiled ad stream to a targeted audience based at least in part on the optimal frequency-to-action for the ad stream. As disclosed below in connection with FIG. 3, the process 260 can include scheduling a presentation of the ad stream to a targeted audience, presenting the ad stream and its companion element 222 to the target audience in accordance with the schedule, recording impressions of the ad stream and if applicable, detecting indications of responses from the targeted audience to the call-to-action included in the ad stream 222. The output of process 260 can be an updated optimal frequency-to-action for the ad stream 265. However, the output 265 of process 260 becomes part of the ad stream profile 212 because process 260 is implemented self-consistently to use the updated profile 212 as an input in optimizing 260 future presentations of the profiled ad stream to the targeted audience.

Figure 2B:
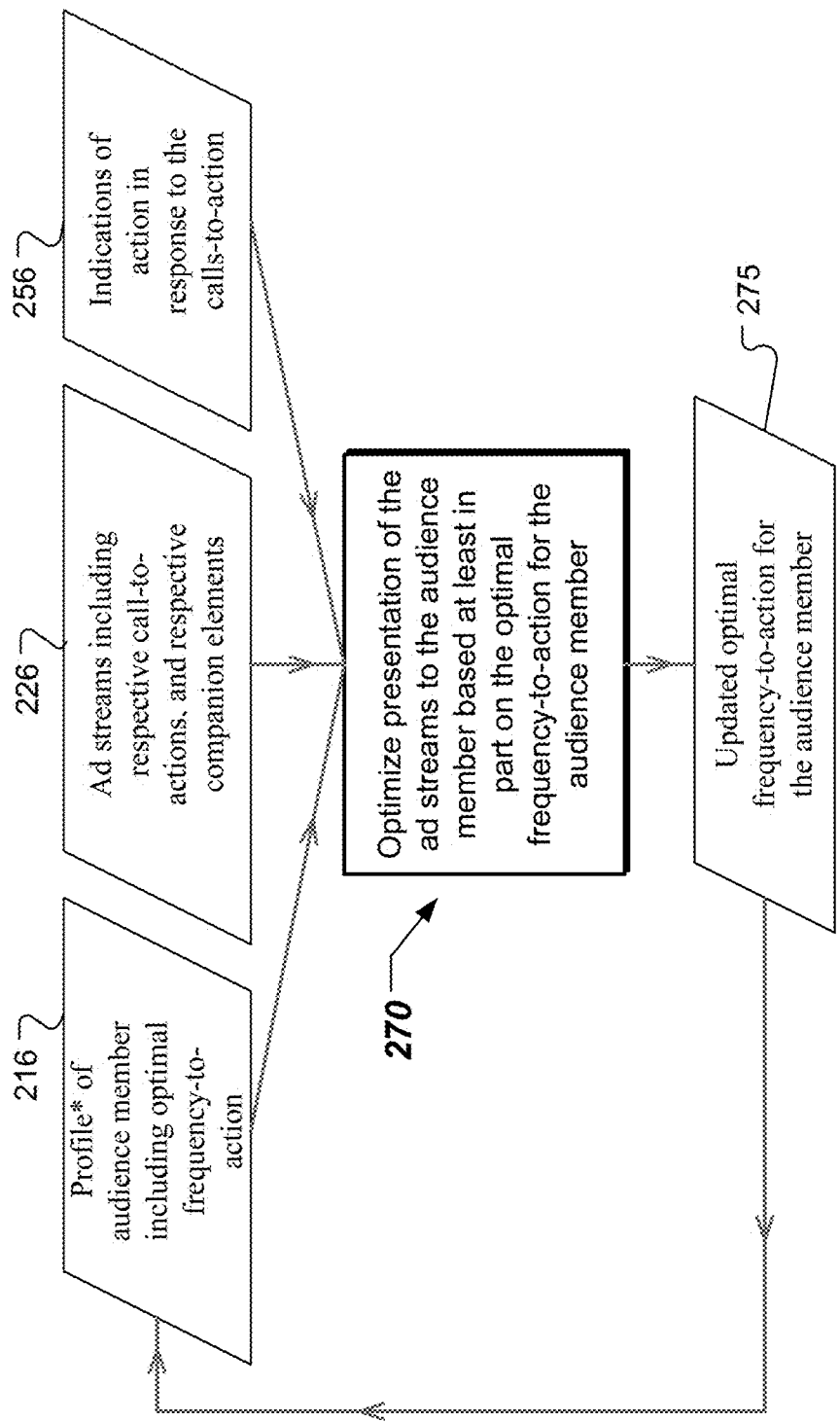
FIG. 2B shows a diagram of a process for optimizing presentation of ad streams to an audience member.

FIG. 2B shows a diagram of a process for optimizing presentation of ad streams to an audience member. The process 270 can be implemented, for example, by the hub computer system 30 of the internet-based provider of advertising services. The inputs of process 270 can be a profile of an audience member 216 including an optimal frequency-to-action for the audience member, ad streams including respective calls-to-action and respective companion elements 226, and indication of actions in response to the calls-to-action 256. The inputs 216 and 226 can be maintained by and/or can be stored at the hub computer system 30, and the input 256 can be received from a client computer 10 associated with the audience member.

The process 270 can be implemented to use the received inputs 216, 226 and 256 to optimize presentation of ad streams to the audience member based at least in part on the optimal frequency-to-action for the audience member. As disclosed below in connection with FIG. 3, the process 270 can include scheduling presentations of ad streams to the audience member, presenting the ad streams and their respective companion elements 226 to the audience member in accordance with the schedule, recording impressions of the ad streams and if applicable, detecting indications of responses from the audience member to respective calls-to-action included in the ad streams 226. The output of process 260 can be an updated optimal frequency-to-action for the audience member 275. However, the output 275 of process 270 becomes part of the audience member profile 216 because process 270 is implemented self-consistently to use the updated profile 216 as an input in optimizing 270 future presentations of ad streams to the audience member.

Figure 3:
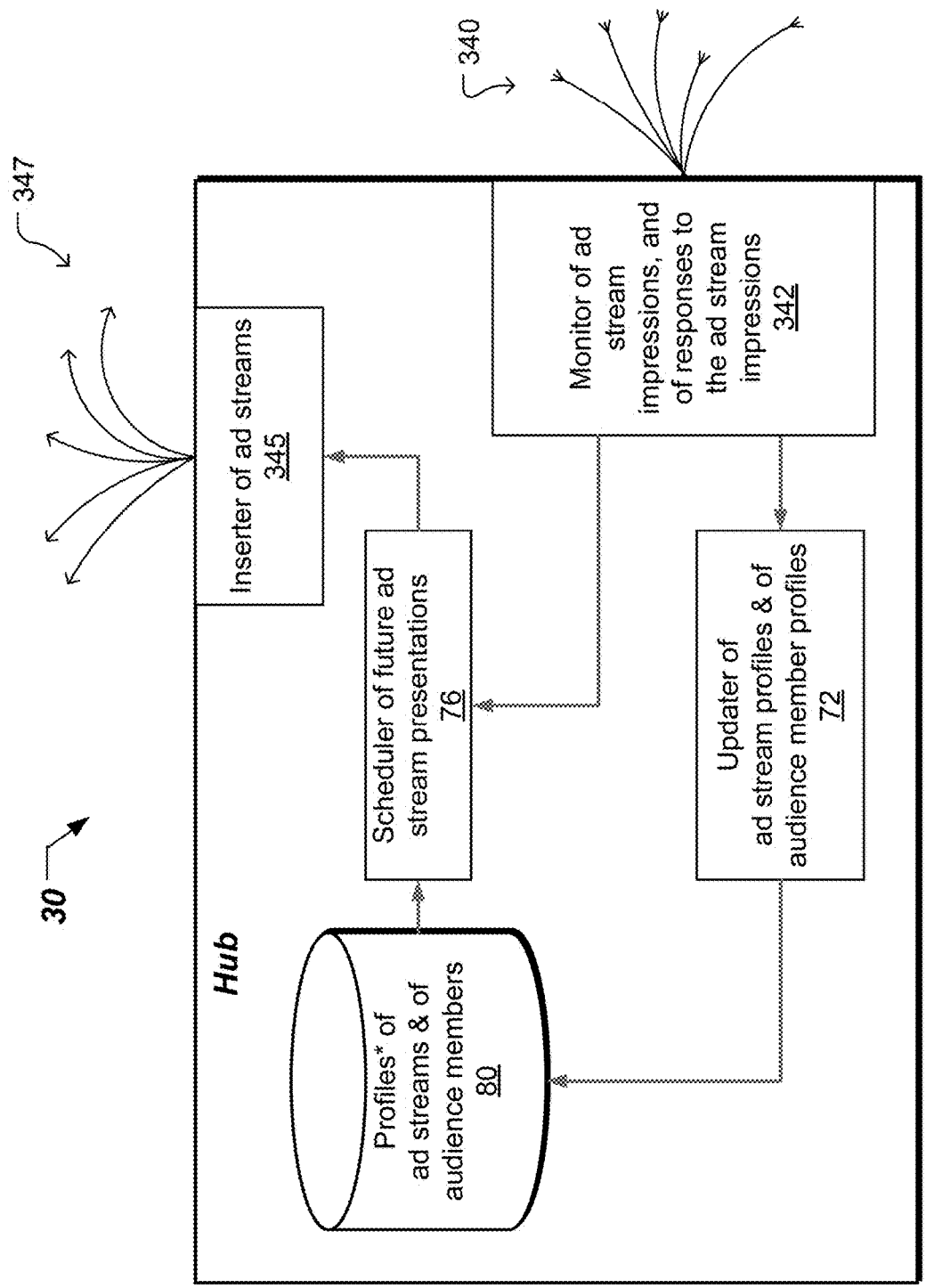
FIG. 3 shows a block diagram of an example system for optimizing presentation of ad streams to a targeted audience.

FIG. 3 shows a block diagram of an example system for optimizing presentation of ad streams to a targeted audience. A hub computer system 30 can be communicatively coupled with a plurality of media streaming computer systems 120 and with client computers 110 associated with an audience of the plurality of the media streaming computer systems 120. The hub computer system 30 can be used to implement, e.g., processes 260 and 270 described above in connection with FIGS. 2A-2B. For example, the hub computer system 30 is configured in accordance with machine learning techniques to collect information related to the frequency of plays by an audience member of an ad stream prior to the audience member having clicked on the companion element of the presented ad stream. The collected information can be input into simulations to model ad stream presentation effectiveness.

The hub computer system 30 includes a module 345 configured to insert ad streams into ad slots of media streams being presented by the plurality of media streaming computer systems 120 to the client computers 110. The insertion instructions 347 are being transmitted via the internet 50. Further, the ad streams are inserted in accordance with an insertion schedule generated by module 76 configured to bid for or reserve slots available for the media streams presented by the plurality of media streaming computer systems 120 to the client computers 110.

In addition, the hub computer system 30 includes a module 342 configured to monitor impressions of ad streams that are presented to the client computers 110 by the plurality of media streaming computer systems 120. Additionally, module 342 is configured to monitor responses to the ad stream impressions from the client computers 110. According to the methods and systems disclosed in this specification, the monitored responses can include indications of actions performed by respective audience members in response to corresponding calls-to-action delivered by the ad streams. The actions may include click-events or conversion-events as described above in connection with FIG. 1A. For ad streams without a direct feedback mechanism (e.g., without a companion element,) a view-thru conversion tracking mechanism can be used to track indications of action in response to respective ad stream presentations. Impressions of ad streams for an audience member can be tracked, e.g., via a cookie or a unique ID of a set-top box. Signals 340 for monitoring the impressions and the responses are being received by the hub computer system 30 via the internet 50.

Figure 4A:
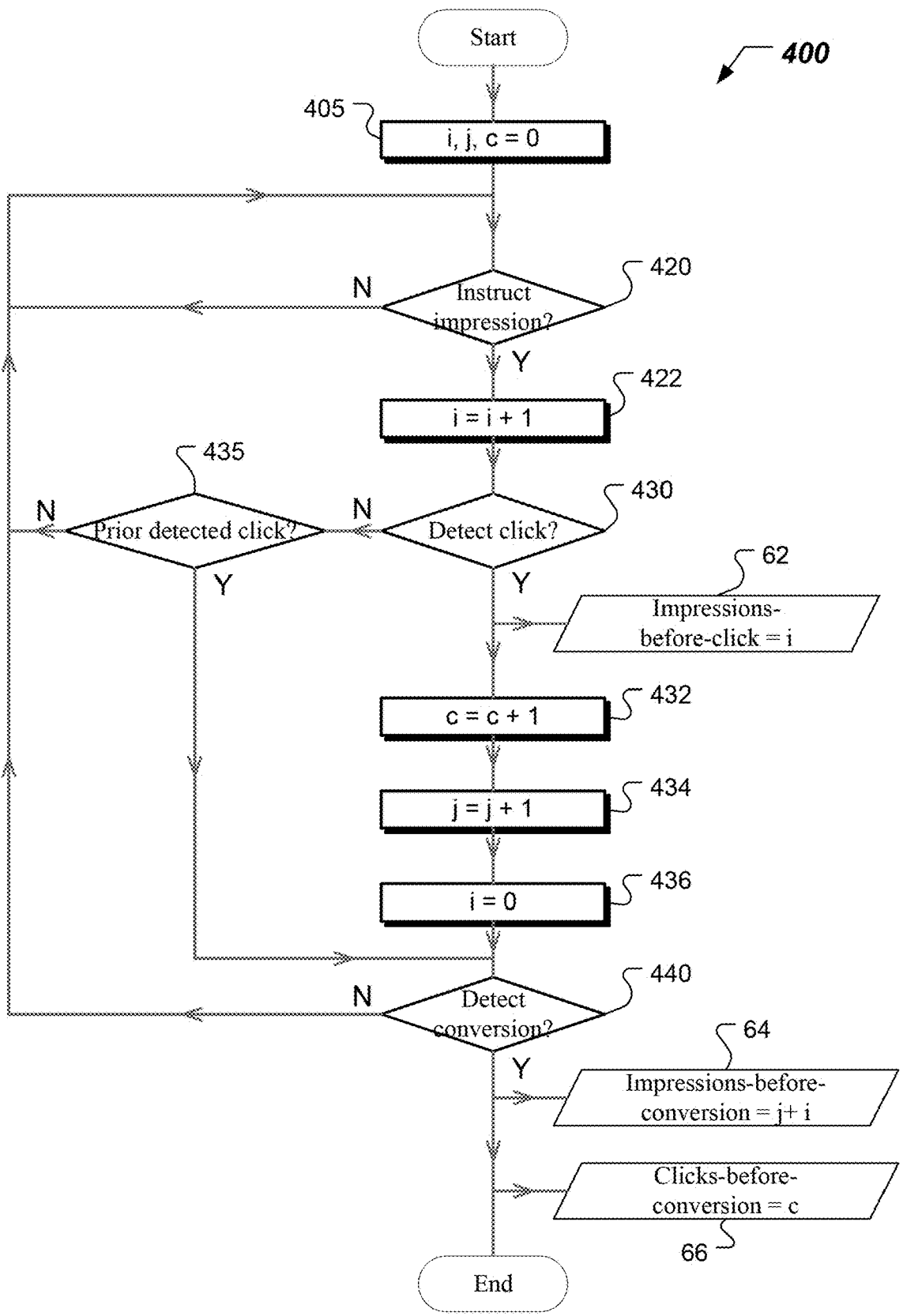
FIG. 4A shows a flow chart of an example process for acquiring feedback information relating to the presentation of an ad stream to an audience member.

FIG. 4A shows a flow chart of an example process for acquiring feedback information relating to the presentation of ad streams to a target audience. Specifically, three types of events can be tracked using method 400. The first type of event is an impression, i.e., a presentation of the ad stream to an audience member. An impression can be tracked through a cookie located on the client computer 10 associated with the audience member. The cookie can record how many times a given advertisement has been played by the player, even if no clicking events have occurred for the given advertisement. Other ways to identify an audience member is by the audience member ID or by the IP address of the client computer 10. The second type of event is a click-event recorded when the audience member clicks on the companion element of the advertisement stream. The third type of event is a conversion-event tracked through a cookie or trough other means for tracking an indication that the audience member has purchased the product or service advertised by the ad stream.

Method 400 can be implemented by the monitor module 342 to detect a number of presentations of an ad stream to an audience member before detecting a click on the companion element of the advertisement stream by the audience member. Once the audience member has clicked, method 400 can be further implemented by the monitor module 342 to determine the additional number of subsequent presentations for influencing the audience member to visit the advertiser's site and to purchase the advertised product.

Method 400 begins by initializing 405 count variables "i", "j", and "c" to zero. Count variable "i" corresponds to the current (instant) number of impressions 62 of the ad stream before a click-event is detected 430 at the client computer associated with the audience member. The count variable "i" is reset 436 to zero after detection 430 of each click-event. Count variable "c" corresponds to the current (instant) number of click-events 66 detected 440 before a conversion-event. Compound-count variable "j+i" corresponds to the current (instant) number of impressions 64 of the ad stream before a conversion-event is detected 440 at the client computer associated with the audience member.

The monitor module 342 verifies 420 whether inserter module 345 has instructed 347 an impression of the ad stream to the audience member. If the verification 420 produces a positive result, the current number of impressions "i" is incremented 422 by one. If the verification 420 produces a negative result, the monitor module 342 continues the monitoring process 400 by looping back to step 420.

If the monitor module 342 detects 430 a click-event at the client computer associated with the audience member, then the impressions-before-click 62 is set to equal "i". Further, the current number of click-events "c" is incremented 432 by 1, the intermediate variable "j" is incremented 434 by 1, and the instant number of impressions "i" is reset 436 to zero. If the verification 430 produces a negative result, the monitor module 342 verifies 435 whether a click-event has been previously detected.

If the verification 435 produces a positive result, the monitor module 342 verifies 440 whether a conversion-event has been detected. If the verification 435 produces a negative result, the monitor module 342 continues the monitoring process 400 by looping back to step 420.

If the verification 440 produces a positive result, the monitor module 342 sets the impressions-before-conversion 64 equal to "j+i", sets the clicks-before-conversion 66 equal to "c", and then ends the monitoring process 400. If the verification 440 produces a negative result, the monitor module 342 continues the monitoring process 400 by looping back to step 420.

Figure 4B:
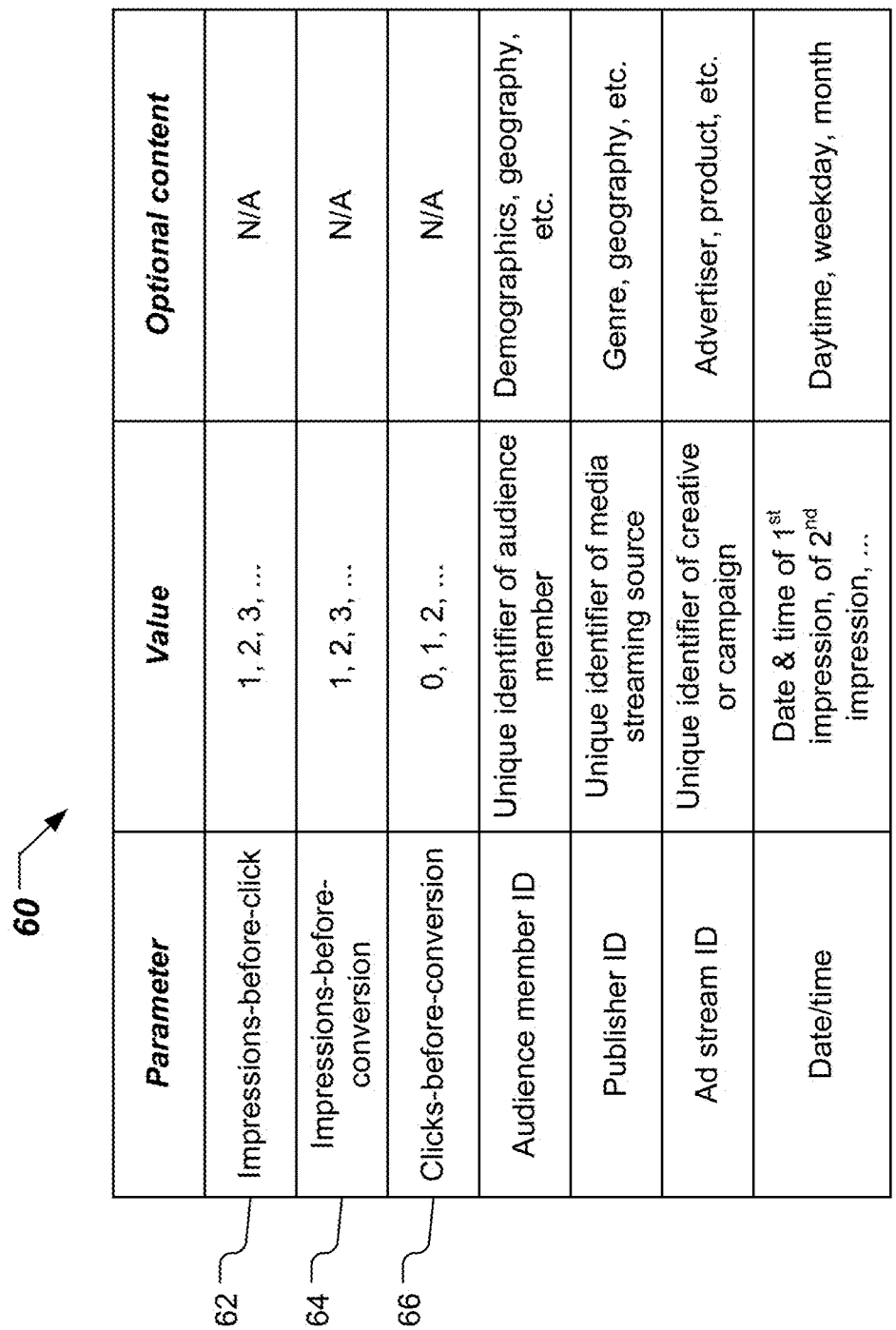
FIG. 4B shows a table containing feedback information collected by the example system for presenting ad streams to a targeted audience.

FIG. 4B shows a table 60 containing feedback information collected by the monitor module 342 by implementing the monitoring process 400. Table 60 groups the collected feedback information under multiple parameters as described below. The feedback information presented in table 60 corresponds to a given ad stream and presented to a particular audience member. The set of parameters and parameter values corresponding to the given ad stream and presented to the particular audience member (as shown in table 60) can be stored in a data repository on a storage device 80 associate with the hub computer system 30, for instance.

The first row of table 60 corresponds to the impressions-before-click parameter 62 determined as an output of monitoring process 400 implemented by the monitor module 342. The minimum value of the impressions-before-click parameter 62 is one, as the ad stream must be played on a client computer 10 associated with the audience member at least once for the audience member to be able to click on the companion element of the ad stream. Thus, the monitor module 342 may detect 1, 2, 3, . . . impressions of the ad stream before detecting a click by the audience member on the companion element of the ad stream.

The second row of table 60 corresponds to the impressions-before-conversion parameter 64 determined as another output of monitoring process 400 implemented by the monitor module 342. The minimum value of the impressions-before-conversion parameter 64 is again one, as the ad stream must be played on the client computer associated with the audience member at least once for the audience member to be able to purchase a product in response to a call-to-action included in the ad stream. Therefore, the monitor module 342 may detect 1, 2, 3, . . . impressions of the ad stream before detecting a conversion-event, for example, a purchase by the audience member of the advertised product in response to the call-to-action included in the ad stream.

The third row of table 60 corresponds to the clicks-before-conversion parameter 66 determined as yet another output of monitoring process 400 implemented by the monitor module 342. The minimum value of the clicks-before-conversion parameter 66 is zero, as the audience member may choose to skip clicking the companion element of the ad stream, and instead, the audience member may directly purchase the advertised product in response to the call-to-action included in the ad stream. In general, the monitor module 342 may detect 0, 1, 2, . . . click-events before detecting a conversion-event, as the audience member may click one or more times on the companion element of the ad stream, presumably to gather additional information about the advertised product before purchasing the product advertised by the ad stream.

The table 60 can further include an audience member ID-parameter to record a unique identifier of the audience member who has experienced the ad stream impression(s). The unique identifier can be extracted from a confirmation message received from the client computer 10 associated with the audience member. The confirmation message includes the contents of a cookie stored on the client computer 10. Additionally, the unique identifier can be inferred from the IP address of the client computer 10. Optionally, the record corresponding to the audience member ID-parameter may also include information relating to the profile of the respective audience member. For example, the information contained in the audience member's profile can include demographics, geography, preferences, etc The Table 60 can additionally include a Publisher-ID-parameter to associate a unique identifier of the publishing computer system 20 associated with the publisher streaming the ad stream. The associated unique identifier can be a machine alias, or a machine IP address. Optionally, the record corresponding to the Publisher-ID-parameter may also include information related to the profile of the radio or TV online station, including, e.g., genre, geography, etc.

The Table 60 can also include an Ad-ID-parameter to record a unique identifier of the ad stream presented by the publisher computer system 20 to the client computer 10 associated with the audience member. Optionally, the record corresponding to the Ad-ID-parameter may include information relating to the advertisement stream or the advertisement campaign. For example, the information relating to the ad stream or to the campaign may include the identity of the advertiser and/or of the product, characteristics of the target audience, etc.

Further, the table 60 can include a date/time-parameter to record the date and time of the $1^{st}$ impression of the ad stream, of the $2^{nd}$ impression, etc. Additionally, the date/time-parameter (or another similar parameter) may record the date and time of the click-events and/or of the conversion-event. Optionally, the record corresponding to the date/time-parameter may also include the equivalent daytime, weekday, season, etc., of the impression or click events, and of the conversion-event.

The information collected by monitor module 342 and summarized in table 60 can be relayed to a module 72 that is configured to update profiles of monitored ad streams. For example, module 72 can group audience members such that each group includes an associated count of audience members who have experienced an associated number of impressions of the ad stream before the associated count of audience members have taken action in response to a call-to-action delivered by the ad stream. Module 72 can further order the groups of audience members by the associated number of impressions of each group to generate a distribution of impressions-before-action for the ad stream. FIG. 5A shows a table 510 that includes in the first row such a distribution of impressions-before-action for the ad stream 565. The short-hand notation "impressions-before-action" 501 represents the "impressions of the ad stream before audience members have taken action in response to a call-to-action delivered by the ad stream." As described above, the distribution 565 corresponding to an ad stream includes groups (bins) that contain counts 503 (ones, tens, hundreds) of units 502 (audience members).

Specifically, the distribution of impressions-before-action for a given ad stream 565 (shown in the first row of Table 510) includes a first group containing a first count of audience members who have experienced one impression of the given ad stream before the audience members of the first group have taken action, a second group containing a second count of audience members who have experienced two impressions of the given ad stream before the audience members of the second group have taken action, a third group containing a third count of audience members who have experienced three impressions of the given ad stream before the audience members of the third group have taken action, and so on.

The detected action 504 can be a click on the companion element of the ad given ad stream, and/or a purchase of a product advertised by the given ad stream. The impressions-to-action distribution for the ad 565 described above can be generated based on impressions of the ad stream by the plurality of publishers 120, during multiple genre of programming, and at various daytimes, for instance. Optionally, module 72 can use grouping parameters 505 (chosen, e.g., from among the entries listed in table 60) to generate impressions-before-action distributions for the ad stream 565 that are specific to the respective grouping parameters. For example, the publisher ID can be used for grouping the audience members by the publishers that have streamed the ad stream to generate impressions-before-action distributions for the ad stream 565 that are publisher specific. For another example, the genre of programming published by a publisher or by multiple publishers can be used for grouping the audience members by the genre of programming preempted by the ad stream to generate impressions-before-action distributions for the ad stream 565 that are genre specific. For yet another example, the daytime can also be used for further grouping the audience members by the daytime during which the ad stream has been played to generate impressions-before-action distributions for the ad stream 565 that are daytime specific. Finally, two or more of the grouping parameters can be used to obtain even more specific impressions-to-action distribution for the ad stream 565. For example, module 72 can generate impressions-before-action distributions for the ad stream 565 that are specific to a particular genre of programming published at a certain daytime by a given publisher.

Additionally, the information collected by monitor module 342 and summarized in table 60 can be relayed to the module 72 that is configured to update profiles of monitored audience members 575. For example, module 72 can group ad streams which have been presented to an audience member such that each group includes an associated count of ad streams which have been presented to the audience member for an associated number of impressions of each of the associated count of ad streams before the audience member has taken action in response to calls-to-action delivered, respectively, by the associated count of ad streams. Module 72 can further order the groups of ad streams by the numbers of impressions associated with each group to generate a distribution of impressions-before-action for the audience member 575. Table 510 includes in the second row such distribution of impressions-before-action for the audience member 575. The short-hand notation "impressions-before-action" 501 represents in this case the "impressions of ad streams before the audience member has taken action in response to calls-to-action delivered, respectively, by the ad streams." As described above, the distribution 575 corresponding to an audience member includes groups (bins) that contain counts 503 (ones, tens, hundreds) of units 502 (ad streams).

The distribution of impressions-before-action for a given audience member 575 (shown in the second row of Table 510) includes a first group containing a first count of ad streams which have been presented to the given audience member for one impression of each ad stream of the first group before the given audience member has taken action in response to calls-to-action delivered, respectively, by the ad streams of the first group; a second group containing a second count of ad streams which have been presented to the given audience member for two impressions of each ad stream of the second group before the audience member has taken action in response to calls-to-action delivered, respectively, by the ad streams of the second group; a third group containing a third count of ad streams which have been presented to the given audience member for three impressions of each ad stream of the third group before the audience member has taken action in response to calls-to-action delivered, respectively, by the ad streams of the third group, and so on.

The action 504 can be a click on corresponding companion elements of ad streams, and/or a purchase of corresponding products advertised by the ad streams. The impressions-to-action distribution for the audience member 575 described above can be generated based on impressions of ad streams streamed by the plurality of publishers 120, during multiple genre of programming, and at various daytimes, for instance. Optionally, module 72 can use grouping parameters 505 (chosen, e.g., from among the entries listed in table 60) to generate impressions-before-action distributions for the audience member 575 that are specific to the respective grouping parameters. For example, the publisher ID can be used for further grouping ad streams by the publishers that have streamed the ad streams to the audience member to generate impressions-before-action distributions for the audience member 575 that are publisher specific. As another example, the genre of programming published by a publisher or by multiple publishers can be used for grouping ad streams by the genre of programming preempted by the ad streams to generate impressions-before-action distributions for the audience member 575 that are genre specific. As yet another example, the daytime can also be used for further grouping ad streams by the daytime during which the ad streams have been played to generate impressions-before-action distributions for the audience member 575 that are daytime specific. Finally, two or more of the grouping parameters can be used to obtain even more specific impressions-to-action distribution for the audience member 575. For example, module 72 can generate impressions-before-action distributions for the audience member 575 that are specific to a particular genre of programming published at a certain daytime by a given publisher.

Figure 5B:
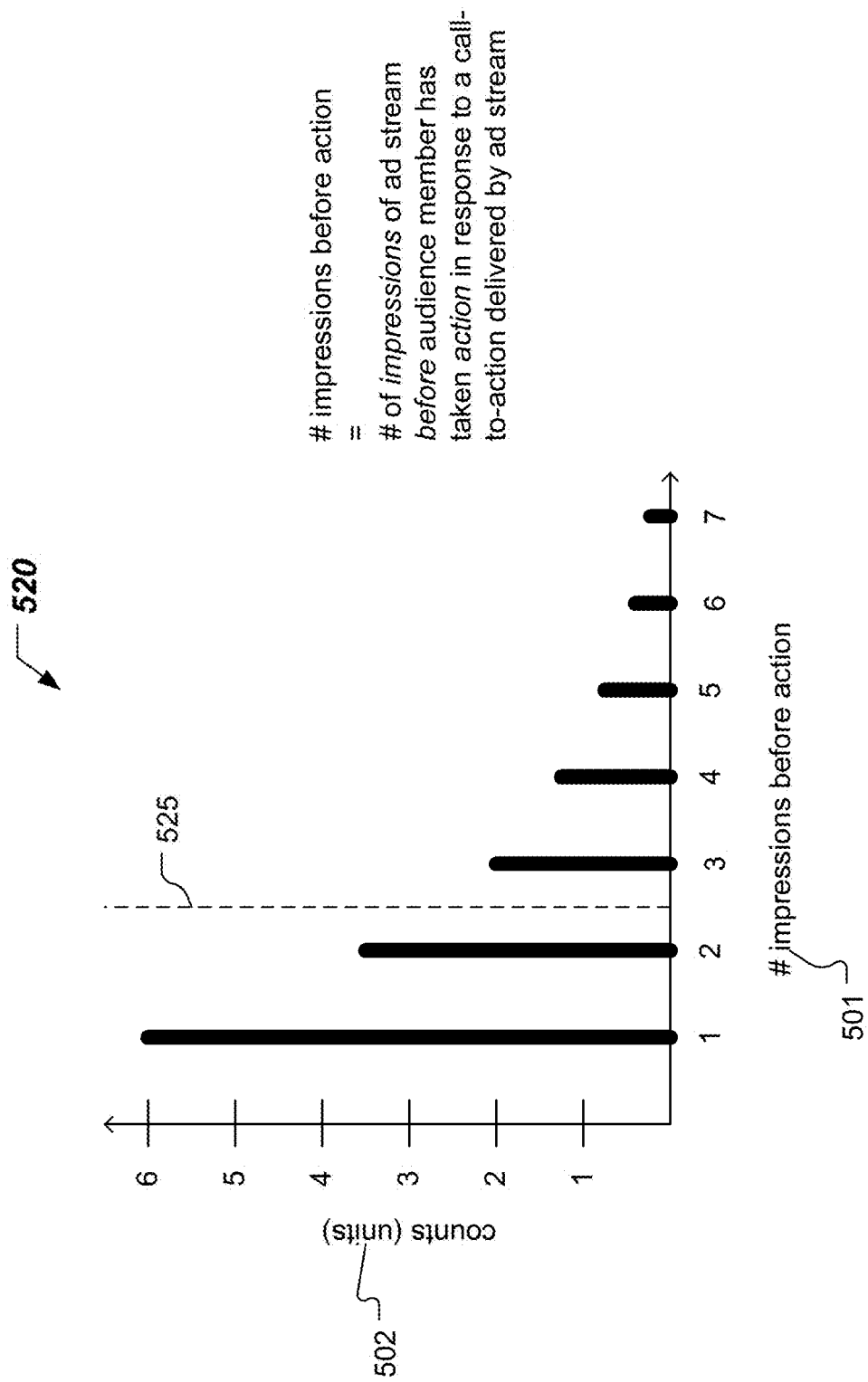
Figure 5C:
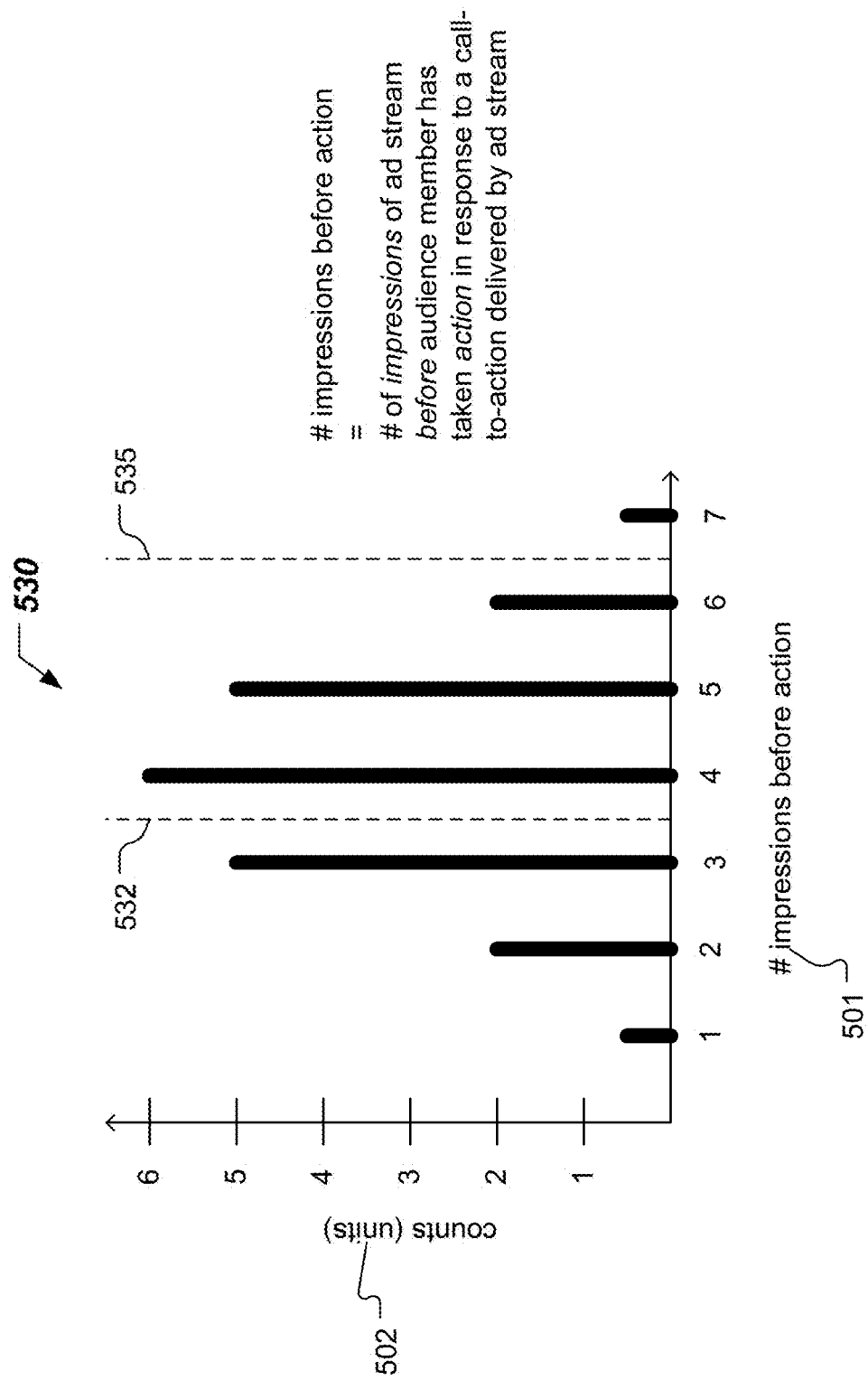

FIGS. 5B and 5C show example distributions 565 and/or 575 generated by module 72 based on information collected by module 342.

For example, the power law distribution 520 illustrated in FIG. 5B can correspond to an impressions-before-action distributions for an ad stream 565. In this example, the counts on the vertical-axis can represent, e.g., hundreds, and the units 502 represent audience members. Each group (bin) represented on the horizontal-axis corresponds to an associated number of impressions-before-action 501. Therefore, the first group contains a count of 600 audience members who have experienced one impression of the ad stream before the audience members of the first group have taken action, the second group contains a count of 350 audience members who have experienced two impressions of the ad stream before the audience members of the second group have taken action, a third group contains a count of 200 audience members who have experienced three impressions of the given ad stream before the audience members of the third group have taken action, and so on.

The effectiveness of a call-to-action delivered by an ad stream characterized by a power law distribution 520 decreases for each additional impression of the ad stream. Therefore, the impressions-before-action distribution 565 determined to follow a power law distribution 520 can be used to estimate a number of impressions-before-action corresponding to a fraction of the audience targeted to respond to the call-to-action. Based on the estimate, the scheduler module 76 can schedule future impressions for an ad stream to be less than a predetermined number of impressions 525 equal to the estimated number. For the example ad stream having an effectiveness represented by the power law distribution 520 (as illustrated in FIG. 5B), the desired fraction of the audience targeted to respond to the call-to-action delivered by the ad stream may be set to 70%. In this case, an estimated 70% of the members of a future audience would respond to the call-to-action delivered by the first and second impressions of the ad stream. Thus, the predetermined number of impressions 525 is set to two, and a schedule of future presentations of the ad stream would include two impressions per audience member.

Alternatively, the power law distribution 520 illustrated in FIG. 5B can correspond to an impressions-before-action distributions for an audience member 575. In this instance, the counts on the vertical-axis can represent, e.g., tens, and the units 502 represent ad streams. Each group (bin) represented on the horizontal-axis corresponds to an associated number of impressions-before-action 501. Therefore, the first group contains a count of 60 ad streams which have been presented to the given audience member for one impression of each ad stream of the first group before the given audience member has taken action in response to calls-to-action delivered, respectively, by the ad streams of the first group; a second group containing a count of 35 ad streams which have been presented to the given audience member for two impressions of each ad stream of the second group before the audience member has taken action in response to calls-to-action delivered, respectively, by the ad streams of the second group; a third group containing a count of 20 ad streams which have been presented to the given audience member for three impressions of each ad stream of the third group before the audience member has taken action in response to calls-to-action delivered, respectively, by the ad streams of the third group, and so on.

The effectiveness of calls-to-action delivered, respectively, by ad streams presented to an audience member characterized by a power law distribution 520 decreases for each additional impression of the respective ad stream. Therefore, the impressions-before-action distribution for the audience member 575 determined to follow a power law distribution 520 can be used to estimate a number of impressions-before-action corresponding to a fraction of the total number of ad streams to which the audience member is targeted to respond. Based on the estimate, the scheduler module 76 can schedule future impressions for respective ad streams to be less than a predetermined number of impressions 525 equal to the estimated number. For the example power law distribution 520 (as illustrated in FIG. 5B,) the desired fraction of the total number of ad streams to which the audience member is targeted to respond may be set to 70%. In this case, the audience member would respond to an estimated 70% of future ad streams in response to the first and second impressions of each of the future ad streams. Thus, the predetermined number of impressions is set to two, and a schedule of future presentations of ad streams to the audience member would include two impressions per ad stream.

FIG. 5C illustrates a Gaussian (a.k.a. bell curve) distribution 530 that can correspond to an impressions-before-action distributions for an ad stream 565. In this example, the counts on the vertical-axis can represent, e.g., hundreds, and the units 502 represent audience members. Each group (bin) represented on the horizontal-axis corresponds to an associated number of impressions-before-action 501. Therefore, the first group contains a count of 50 audience members who have experienced one impression of the ad stream before the audience members of the first group have taken action, the second group contains a count of 210 audience members who have experienced two impressions of the ad stream before the audience members of the second group have taken action, a third group contains a count of 520 audience members who have experienced three impressions of the given ad stream before the audience members of the third group have taken action, and so on.

The effectiveness of a call-to-action delivered by an ad stream characterized by a Gaussian distribution 530 increases for each additional impression of the ad stream up to a particular number of impressions for which the effectiveness reaches a maximum. Therefore, the scheduler module 76 may schedule a minimum number of impressions of the ad stream 532 to enable the call-to-action delivered by the ad stream to reach its peak effectiveness. The minimum number of impressions can be set to coincide with the particular number, in some instances. However, the minimum number of impressions can be set to be one less than the particular number, in some other instances. Additionally, the effectiveness of the ad stream characterized by the Gaussian distribution 530 decreases for each additional impression of the ad stream presented after the particular number of impressions. Accordingly, the impressions-before-action distribution 565 determined to follow the Gaussian distribution 530 can be used to estimate a number of impressions-before-action corresponding to a fraction of the audience targeted to respond to a call-to-action delivered by the ad stream. Based on the estimate, the scheduler module 76 can schedule future impressions for the ad stream to be less than a predetermined number of impressions 535 equal to the estimated number.

For the example ad stream having an effectiveness represented by the Gaussian distribution 530 (as illustrated in FIG. 5C), the particular impression representing the most effective impression for the example ad stream is the fourth impression. Therefore, a minimum number of three impressions are being scheduled by the scheduler module 76 such that the next impression (the fourth) can deliver the call-to-action most effectively. Additionally for the example ad stream characterized by the Gaussian distribution 530, the desired fraction of the audience targeted to respond to the call-to-action delivered by the ad stream may be set to 97%. In this case, an estimated 97% of the members of a future audience would respond to the call-to-action delivered by the first, second, . . . , and sixth impressions of the ad stream. Thus, the predetermined number of impressions is set to six, and a schedule of future presentations of the ad stream would include six impressions per audience member.

Alternatively, the Gaussian distribution 530 illustrated in FIG. 5C can correspond to an impressions-before-action distribution for an audience member 575. In this instance, the counts on the vertical-axis can represent, e.g., tens, and the units 502 represent ad streams. Each group (bin) represented on the horizontal-axis corresponds to an associated number of impressions-before-action 501. Therefore, the first group contains a count of 5 ad streams which have been presented to the audience member for one impression of each ad stream of the first group before the audience member has taken action in response to calls-to-action delivered, respectively, by the ad streams of the first group; a second group containing a count of 21 ad streams which have been presented to the audience member for two impressions of each ad stream of the second group before the audience member has taken action in response to calls-to-action delivered, respectively, by the ad streams of the second group; a third group containing a count of 52 ad streams which have been presented to the audience member for three impressions of each ad stream of the third group before the audience member has taken action in response to calls-to-action delivered, respectively, by the ad streams of the third group, and so on.

The effectiveness of calls-to-action delivered respectively by ad streams presented to an audience member characterized by the Gaussian distribution 530 increases for each additional impression of the respective ad stream up to a particular number of impressions for which the effectiveness reaches a maximum. Therefore, the scheduler module 76 may schedule a corresponding minimum number of impressions for future ad streams 532 to enable the calls-to-action delivered, respectively, by the future ad streams to reach peak effectiveness. The minimum number of impressions can be set to coincide with the particular number, in some instances. However, the minimum number of impressions can be set to be one less than the particular number, in some other instances. Additionally, the effectiveness of the calls-to-action delivered respectively by the ad streams presented to the audience member characterized by the Gaussian distribution 530 decreases for each additional impression of the corresponding ad stream presented to the audience member after the particular number of impressions. Accordingly, the impressions-before-action distribution for the audience member 575 determined to follow the Gaussian distribution 530 can be used to estimate a number of impressions-before-action corresponding to a fraction of the total number of ad streams to which the audience member is targeted to respond. Based on the estimate, the scheduler module 76 can schedule respective impressions for future ad streams to be less than a predetermined number of impressions 535 equal to the estimated number.

For the example Gaussian distribution 530 (as illustrated in FIG. 5C), the particular impression representing the most effective impression for the example audience member is the fourth impression. Therefore, a minimum number of three impressions are being scheduled by the scheduler module 76 such that the respective next impression (the fourth) can deliver the call-to-action most effectively. Additionally for the example Gaussian distribution 530, the desired fraction of the total number of ad streams to which the audience member is targeted to respond may be set to 97%. In this case, the audience member would respond to an estimated 97% of future ad streams in response to the first, second, . . . , and sixth impressions of each of the future ad streams. Thus, the predetermined number of impressions is set to six, and a schedule of future presentations of ad streams to the audience member would include six impressions per ad stream.

The impressions-before-action distributions for ad streams 565 generated and/or updated by module 72 can be stored as part of respective ad stream profiles in a data repository hosted by a storage device 80 associated with the hub computer system 30. In some implementations, the data repository can also include copies of the ad streams. Additionally, the impressions-before-action distributions for audience members 575 generated and/or updated by module 72 can be stored as part of respective audience member profiles in the data repository hosted by the storage device 80.

The impressions-before-action distribution for an ad stream 565 stored on the storage device 80 can be used by the scheduler module 76 to model the future presentation effectiveness of the ad stream. Additionally, the impressions-before-action distribution for an audience member 575 can be used to schedule and optimize presentation effectiveness of ad streams played for the audience member. An input to the foregoing scheduler module can be the number of times an audience member plays an ad stream before the audience member takes action and clicks on the companion element of the ad stream. Using such information, the model may predict and prescribe the most effective number of times to play an ad stream before audience members may respond to the played ad stream. Another input to the scheduler module 76 is relayed by the monitor module 342 and includes the information contained in table 60 for providing the scheduler module 76 with live updates of an interest status for the monitored target audience 110. A further input used by the scheduler module 76 to optimize the future presentation effectiveness of the ad stream is an inventory of advertisement slots available across the plurality of publishers 120. The available slots may include unsold ad slots and ad slots that may be preempted via an auction process.

Based on the information (impressions, clicking and conversion events) collected by the monitor module 342, the generator/updater module 72 can estimate the number of times (on the average) an audience member plays an ad stream before clicking on the ad's companion element, to follow-up on information presented by the ad stream. Such statistical information, referred to as optimal frequency-to-action, can also be used by the scheduler module 76 configured in accordance with machine learning techniques to optimize future presentations of the ad stream. For example, the optimal frequency-to-action can represent an input to a model used by the scheduler module 76 for predicting ad stream effectiveness. For example, the scheduler module 76 can use artificial intelligence models to predict the probability that an audience member clicks on a companion element of a given ad stream based on a multitude of input signals (listed for example in table 60) including the publisher environment, the geographic location, the estimated optimal frequency-to-action, and the stored impressions-to-action distributions 565 and/or 575. Additionally based on the above input signals, artificial intelligence models run by the scheduler module 76 can predict a percentage of audience members that would click on the companion element of an ad stream after a given number of impressions of the ad stream. Finally, the scheduler module 76 can schedule the future presentations of the ad stream in accordance to the foregoing predictions. The methods disclosed in this specification can be applied to different types of ads and a variety of users in accordance with a type of the respective impressions-to-action distributions 565 and 575.

For example, if the effectiveness of a call-to-action delivered by an advertisement stream is characterized by a bell curve distribution 530, the schedule can be optimized such that audience members play the advertisement stream a sufficient number of times to come close to or reach the particular impression that has maximum effectiveness (e.g., at the middle of the bell curve the audience members are very likely to click on the companion element of the ad stream.) In general, the effectiveness or impressions-before-click distributions of ad creatives 565 that rely on a branding effect can be in the form of a bell curve distribution 530. For such ad streams, the probability that an audience member will click on the respective companion elements increases with the number of impressions up to a particular impression corresponding to the peak of the bell curve, then the foregoing probability decreases for subsequent impressions of the respective branding message delivered by the ad streams.

For instance, the updater/generator module 72 can determine that audience members may click on a companion element of a certain advertisement stream only after having played the certain advertisement stream at least two or three times. Such information about the certain ad stream is stored in the storage device 80. Further, the monitor module 342 can detect that an audience member has already played the certain advertisement stream two times. Accordingly, the scheduler module 76 would use the information retrieved from the storage device 80 and the additional information provided in real time by the monitor module 342 to schedule the certain ad stream to play for the audience member, because there is a high probability that the audience member would click on the companion element upon playing the advertisement stream for the third time.

Alternatively, the effectiveness of ad creatives that do not deliver a branding message tends to follow a power law distribution 520, thus the effectiveness of the message delivered by each subsequent impression of the ad streams decreases. For certain advertisement streams, the updater/generator module 76 can determine that if audience members do not click on the companion banner after the first impression of the advertisement stream, the probability that the audience members would click later decreases (as described in connection with FIG. 5C.) Therefore, such ad streams can be scheduled by the scheduler module 76 to play for audience members who are known to not have played that advertisement stream before, because it is more probable that such audience members may respond to the ad by clicking on the companion element. In contrast, such ad streams would not be scheduled to play for audience members who have already played that advertisement once or twice before and instead another ad would be scheduled to play for the later audience members. For example, the later audience members would be presented an ad stream that they have not played before.

The hub computer system 30 disclosed in this specification can be used to implement a method for scheduling one or more impressions for future presentations of an ad stream. The ad stream can be inserted into media streams being streamed to client computers 110. The ad stream includes a call-to-action for an audience associated with the client computers 110. A distribution of impressions-before-action for the ad stream 565 can be determined based on such inserting. An impression represents one presentation of the ad stream to one of the client computers 10. An action corresponds to an interaction of an audience member with the one of the client computers 10 in response to the call-to-action. The impressions-before-action distribution for the ad stream 565 represents a set of ordered counts of audience members, as described in connection with FIGS. 5A-5C. A first count of audience members responded to the call-to-action after one impression of the ad, a second count of audience members responded to the call-to-action after two impressions of the ad, and so on. One or more impressions for future presentations of the ad stream can be scheduled by the scheduler module 76, such that (i) if the determined impressions-before-action distribution for the ad 565 includes decreasing counts, a scheduled number of impressions is smaller than a predetermined number of impressions 525. Additionally, one or more impressions for future presentations of the ad stream can be scheduled by the scheduler module 76, such that (ii) if a maximum count of the determined impressions-before-action distribution for the ad 565 corresponds to audience members who responded to the call-to-action after a particular number of impressions of the ad stream (the particular number being larger than 1), a scheduled number of impressions is larger than or equal to a minimum number of impressions 532 and smaller than or equal to a predetermined number of impressions 535. The minimum number 532 is smaller than or equal to the particular number, and the predetermined number 535 is larger than or equal to the particular number.

The determined types 520, 530 of impressions-before-action distributions for the ad 565 can be used to estimate a number of impressions-before-action corresponding to a fraction of the audience targeted to respond to the call-to-action. For example, the fraction of the audience targeted to respond to the call-to-action is 90%. Based on the estimate, the hub computer system 30 can schedule future impressions for an ad stream to be less than a predetermined number 525, 535 equal to the estimated number.

Figure 6:
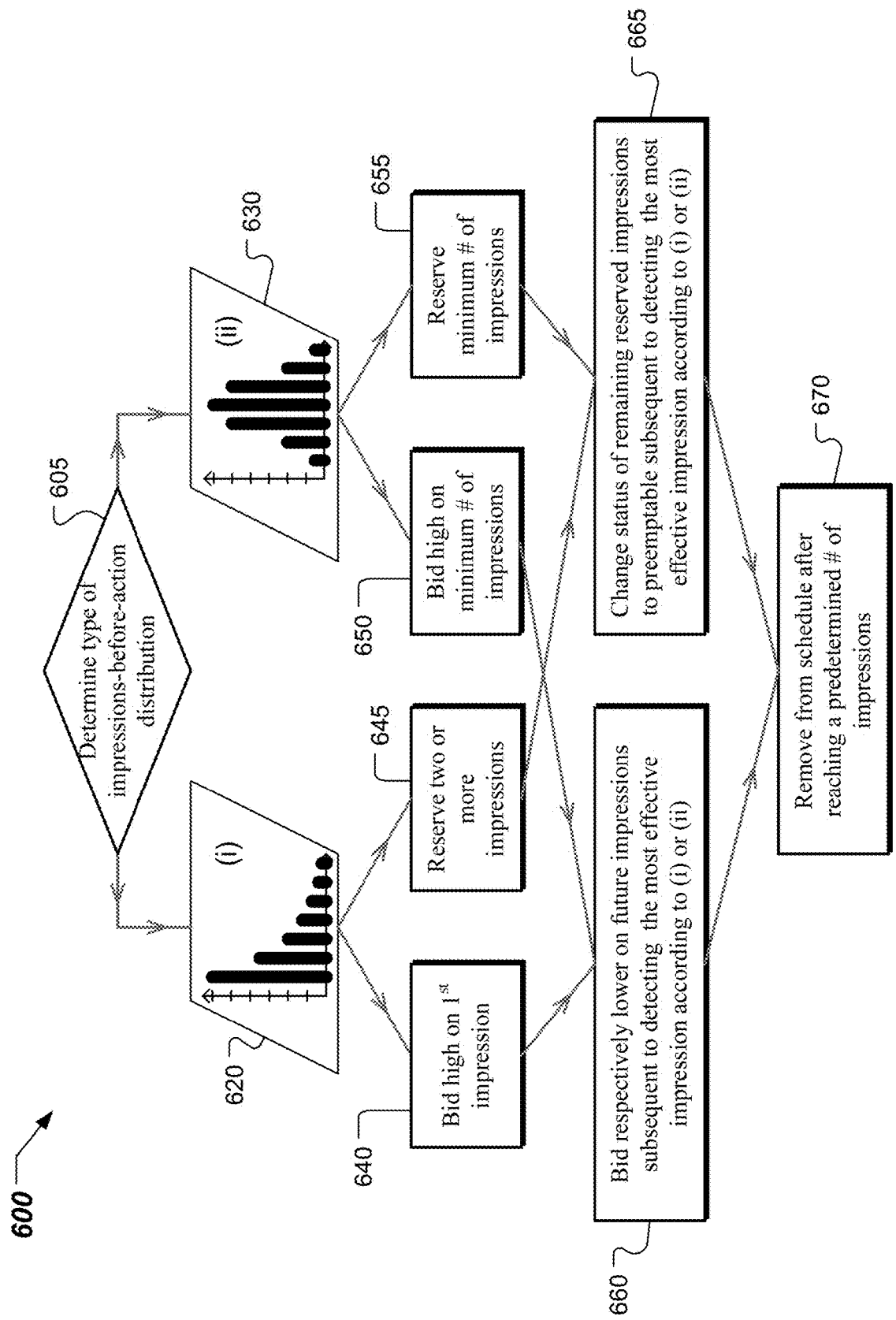
FIG. 6 shows a flow chart of an example process for scheduling presentation of an ad stream to a target audience based on the profile of the ad.

An example process for scheduling presentation of an ad stream to a target audience based on the profile of the ad can be implemented by the scheduler module 76 in accordance with a flow chart 600 illustrated in FIG. 6. Once the type of impressions-before-action distribution for an ad stream has been determined 605 based on the methods and systems described above, the scheduler module 76 can schedule one or more impressions for future presentations of the ad stream responsive to the determined distribution type.

The result of the determination 605 can be a type-(i) impressions-before-action distribution 620. In auction-based scheduling implementations, the scheduler module 76 is configured to bid 640 a high price-per-spot for a first impression of the ad stream. Once the most effective presentation, corresponding to the first impression of the ad stream, has been detected by the monitor module 342, the scheduler module 76 is configured to bid 660 respectively decreasing prices-per-spot for subsequent impressions of the ad stream, as these later impressions are respectively less effective, in accordance with the determined impressions-before-action distribution 620. In reservation-based scheduling implementations, the scheduler module 76 is configured to reserve 645 two or more impressions of the ad stream. Once the most effective presentation, corresponding to the first impression of the ad, has been detected by the monitor module 342, the scheduler module 76 is configured to change 665 a status of remaining reserved impressions to preemptable impressions, as these remaining impressions are respectively less effective, in accordance with the determined impressions-before-action distribution 620.

The result of the determination 605 can be a type-(ii) impressions-before-action distribution 630. In auction-based scheduling implementations, the scheduler module 76 is configured to bid 650 a high price-per-spot for impressions of the ad stream up to a minimum number of impressions. In some implementations, the minimum number of impressions can be set equal to a particular number corresponding to a maximum of the type-(ii) impressions-before-action distribution 630. Once the most effective presentations, corresponding to the particular number of impressions, have been detected by the monitor module 342, the scheduler module 76 is configured to bid 660 respectively decreasing prices-per-spot for subsequent impressions of the ad stream, as these later impressions are respectively less effective, in accordance with the determined impressions-before-action distribution 630. In reservation-based scheduling implementations, the scheduler module 76 is configured to reserve 655 the minimum number of impressions of the ad stream. Once the most effective presentations, corresponding to the particular number of impressions, have been detected by the monitor module 342, the scheduler module 76 is configured to change 665 a status of remaining reserved impressions to preemptable impressions, as these remaining impressions are respectively less effective, in accordance with the determined impressions-before-action distribution 630.

Finally, regardless of the determined type of distribution type 620, 630 or of the reservation/auction basis of the scheduling implementations described above, further scheduling of future impressions can subside and whatever impressions are still left on the schedule can be removed 670 from the schedule once the ad stream has been presented for a predetermined number of impressions.

Additionally, the hub computer system 30 disclosed in this specification can be used to implement a method for scheduling future presentations of ad streams to an audience member. Ad streams can be inserted into media streams being streamed to a client computer 10. The ad streams include respective calls-to-action for the audience member associated with the client computer 10. A distribution of impressions-before-action for the audience member 575 can be determined based on such inserting. As described above, an impression represents one presentation of an ad stream to the audience member. An action corresponds to an interaction of the audience member with the client computer 10 in response to the call-to-action included in the ad stream. The impressions-before-action distribution for the audience member 575 represents a set of ordered counts from ad streams previously presented to the audience member. Thus, the impressions-before-action distribution for the audience member 575 includes a first count of ad streams to which the audience member responded after one impression of each among the first count of ad streams, a second count of ad streams to which the audience member responded after two impressions of each of the second count of ad streams, and so on. One or more impressions for future presentations to the audience member of a given ad stream can be scheduled by the scheduler module 76, such that (i) if the determined impressions-before-action distribution for the audience member 575 includes decreasing counts, a scheduled number of impressions of the given ad stream is smaller than a predetermined number of impressions 525. Additionally, one or more impressions for future presentations to the audience member of the given ad stream can be scheduled by the scheduler module 76, such that (ii) if a maximum count of the determined impressions-before-action distribution for the audience member 575 corresponds to ad streams to which the audience member responded after a particular number of impressions of the respective ad streams (the particular number being larger than 1), a scheduled number of impressions of the given ad stream is larger than or equal to a minimum number of impressions 532 and smaller than or equal to a predetermined number of impressions 535. The minimum number 532 is smaller than or equal to the particular number, and the predetermined number 535 is larger than or equal to the particular number.

Accordingly, system 100 described in connection with FIGS. 1A-1B, 3, and 4A-4B can be used in conjunction with the process described in FIG. 2A to schedule future presentations of an ad stream to a targeted audience 110 based at least in part on an updated profile of the ad stream. The hub computer system 30 is configured to instruct the publisher computer system 20 to switch from streaming the media stream to streaming an ad stream to the client computer 10. The ad stream can include a call-to-action for an audience member associated with the client computer 10. The streaming of the media stream is resumed after the presentation of the ad stream. The hub computer system 30 is further configured to monitor, during the streaming of the ad stream by the publisher computer system 20, for an indication of an action taken by the audience member associated with the client computer 10 in response to the call-to-action. Additionally, the hub computer system 30 is configured to update a profile of the ad stream upon resuming the streaming of the media stream by the publisher computer system 20 to the client computer 10. The profile represents a presentation effectiveness of the ad stream. The updating of the profile includes incrementing an impression count, and if the monitoring has detected the action indication, augmenting the profile with information included in the detected action indication. In addition, the hub computer system 30 is configured to schedule future presentations of the ad stream based at least in part on the updated profile.

To perform the updating of the ad stream profile, the hub computer system 30 is further configured to aggregate the information included in the received action indication with information relating to previous presentations of the ad stream by a plurality of publishers 120 to an audience 110 monitored by the hub computer system 30. Further, an optimal frequency-to-action can be reevaluated by the hub computer system 30 as a number of impressions of the ad stream that caused a maximum number of members of the monitored audience 210 to respond to the call-to-action of the ad stream. The reevaluation can be performed across the plurality of publishers 220 and/or can be performed for a particular publisher 20. Further as part of the updating of the ad stream profile, the optimal frequency-to-action can be re-determined for each one of (i) a type of programming corresponding to media streams switched by the ad stream (e.g., a genre of music of a radio stream, etc.,) and (ii) a time of day, a day of a week, and a month.

Additionally or alternatively, the system 100 described in connection with FIGS. 1A-1B, 3, and 4A-4B can be used in conjunction with the process described in FIG. 2B to schedule future ad stream presentations to an audience member based at least in part on an updated optimal frequency-to-action for the audience member. The hub computer system 30 is configured to instruct the publisher computer system 20 to switch from streaming the media stream to streaming an ad stream to the client computer 10. The ad stream can include a call-to-action for an audience member associated with the client computer 10. The publisher computer system is configured to resume the streaming of the media stream after the presentation of the ad stream. The hub computer system 30 is further configured to monitor, during the streaming of the ad stream by the publisher computer system 20, for an indication of an action taken by the audience member associated with the client computer 10 in response to the call-to-action. Additionally, the hub computer system 30 is configured to update an optimal frequency-to-action for the audience member upon resuming the streaming of the media stream by the publisher computer system 20 to the client computer 10. The optimal frequency-to-action for the audience member represents a presentation effectiveness of ad streams to the audience member and includes a number of impressions after which the audience member responded to each of a maximum number of ad streams from among previously presented ad streams. The updating of the optimal frequency-to-action includes incrementing an impression count, and if the monitoring has detected the action indication, augmenting the optimal frequency-to-action with information included in the detected action indication. In addition, the hub computer system 30 is configured to schedule future ad stream presentations for the audience member based at least in part on the updated optimal frequency-to-action.

To perform the updating of the optimal frequency-to-action for the audience member, the hub computer system 30 is further configured to aggregate the information included in the received action indication with information relating to previous presentations of ad streams to the audience member by a plurality of publishers 120. Further, the information included in the received action indication can be aggregated with information relating to previous presentations of ad streams to the audience member by a particular publisher 20. Furthermore, the optimal frequency-to-action for the audience member can be re-determined for each one of (i) a type of programming corresponding to media streams switched by the ad streams (e.g., a genre of music of a radio stream, etc.,) and (ii) a time of day, a day of a week, and a month.

Figure 7:
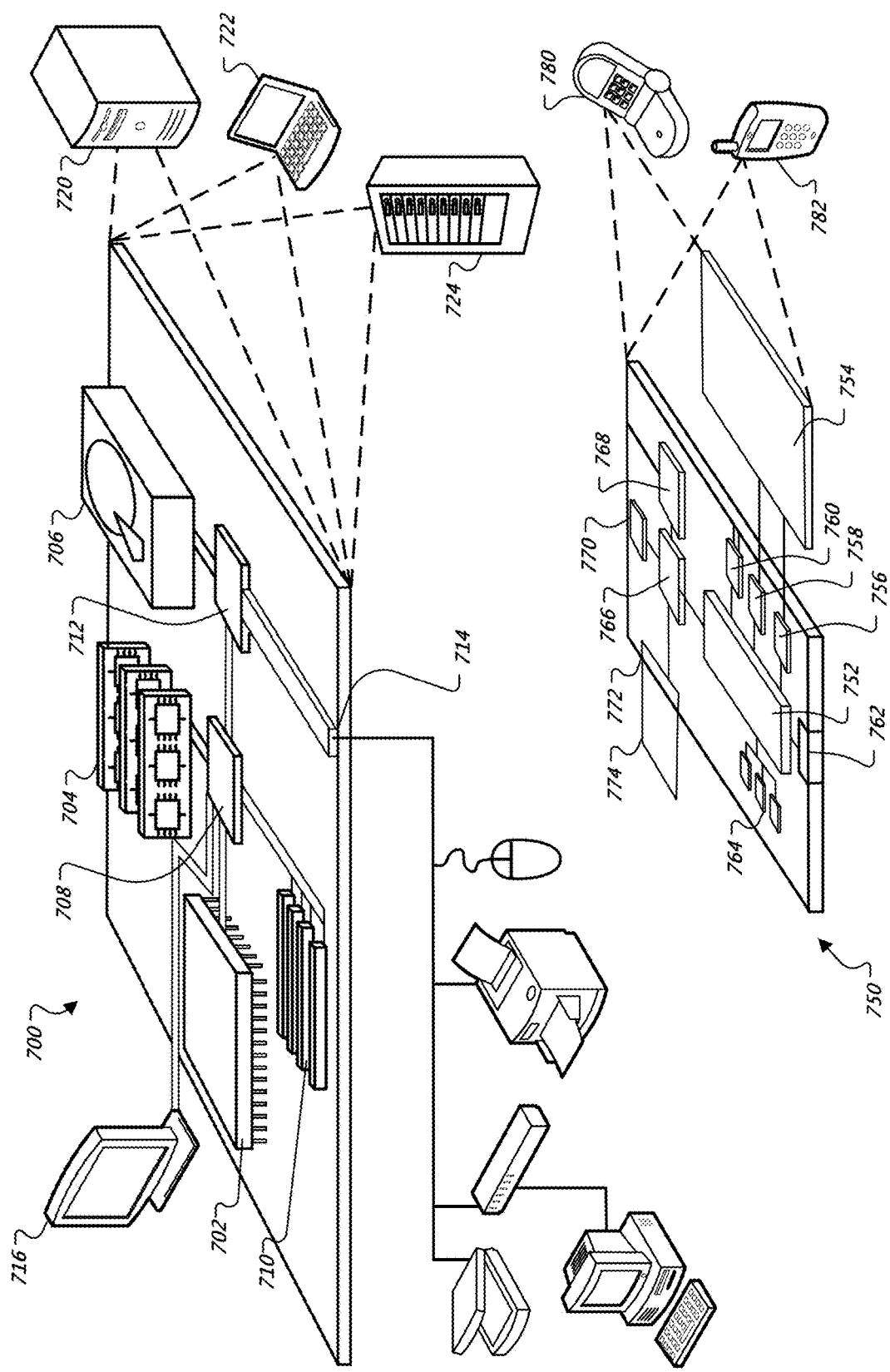
FIG. 7 is a block diagram of computing devices that may be used to implement the systems and methods described in this document.

FIG. 7 is a block diagram of computing devices 700, 750 that may be used to implement the systems and methods described in this document, as either a client or as a server or plurality of servers. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a computer-readable medium. In one implementation, the memory 704 is a volatile memory unit or units. In another implementation, the memory 704 is a non-volatile memory unit or units.

The storage device 706 is capable of providing mass storage for the computing device 700. In one implementation, the storage device 706 is a computer-readable medium. In various different implementations, the storage device 706 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 704, the storage device 706, or a memory on processor 702.

The high speed controller 708 manages bandwidth-intensive operations for the computing device 700, while the low speed controller 712 manages lower bandwidth-intensive operations. Such allocation of duties is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can process instructions for execution within the computing device 750, including instructions stored in the memory 764. The processor may also include separate analog and digital processors. The processor may provide, for example, for coordination of the other components of the device 750, such as control of audience member interfaces, applications run by device 750, and wireless communication by device 750.

Processor 752 may communicate with an audience member through control interface 758 and display interface 756 coupled to a display 754. The display 754 may be, for example, a TFT LCD display or an OLED display, or other appropriate display technology. The display interface 756 may include appropriate circuitry for driving the display 754 to present graphical and other information to an audience member. The control interface 758 may receive commands from an audience member and convert them for submission to the processor 752. In addition, an external interface 762 may be provide in communication with processor 752, so as to enable near area communication of device 750 with other devices. External interface 762 may provide, for example, for wired communication (e.g., via a docking procedure) or for wireless communication (e.g., via Bluetooth or other such technologies).

The memory 764 stores information within the computing device 750. In one implementation, the memory 764 is a computer-readable medium. In one implementation, the memory 764 is a volatile memory unit or units. In another implementation, the memory 764 is a non-volatile memory unit or units. Expansion memory 774 may also be provided and connected to device 750 through expansion interface 772, which may include, for example, a SIMM card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS receiver module 770 may provide additional wireless data to device 750, which may be used as appropriate by applications running on device 750.

Device 750 may also communication audibly using audio codec 760, which may receive spoken information from an audience member and convert it to usable digital information. Audio codex 760 may likewise generate audible sound for an audience member, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with an audience member, the systems and techniques described here can be implemented on a computer having a display device (e.g., a CRT (cathode ray tube) or LCD (liquid crystal display) monitor) for displaying information to the audience member and a keyboard and a pointing device (e.g., a mouse or a trackball) by which the audience member can provide input to the computer. Other kinds of devices can be used to provide for interaction with an audience member as well; for example, feedback provided to the audience member can be any form of sensory feedback (e.g., visual feedback, auditory feedback, or tactile feedback); and input from the audience member can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical audience member interface or a Web browser through which an audience member can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this document contains many specific implementation details, these should not be construed as limitations on the scope of any inventions or of what may be claimed, but rather as descriptions of features specific to particular implementations of particular inventions. Certain features that are described in this document in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system comprising:
one or more server computing devices; and
one or more memory devices storing instructions that when executed by the one or more server computing devices cause the one or more server computing devices to perform operations comprising:
streaming a media stream to one or more of a plurality of client computers, wherein the media stream does not include a mechanism that enables a user to submit a request for additional information about content of the media stream;
presenting, by the one or more server computing devices and within a media player that is streaming the media stream at the one or more of the plurality of client computers, a separate interactive visual companion element that is presented in a different panel of the media player than the media stream and that initiates a request for additional information about the content of the media stream when user interaction with the separate interactive visual companion element occurs;

during the streaming of the media stream, detecting user interaction with the separate interactive visual companion element in the different panel at a given client computer indicating direct feedback that a user is requesting additional information about the content of the media stream;

logging an indication of the user interaction with the separate interactive visual companion element in the different panel; and directing the given client computer to a web page for a provider of the media stream in response to the indication of the user interaction with the separate interactive visual companion element in the different panel.

2. The system of claim 1, wherein access to the additional information is not available to the user via the media stream.

3. The system of claim 1, wherein the instructions cause the one or more server computing devices to perform operations comprising:

accessing a cookie stored at a given client computer among the one or more client computers, wherein the cookie stores information identifying how many times the media stream has been played at the given client computer; and logging, in a log that maintains a count of media stream presentations, how many times the media stream was presented by the media player to a user of the given client computer using the cookie stored at the given client computer.

4. The system of claim 3, wherein the instructions cause the one or more server computing devices to perform operations comprising:

generating, using machine learning techniques applied to the logged indication of the user interaction and the count of the media stream presentations when the user interaction was detected, a predicted number of presentations of the media stream to a subsequent user that will occur before the subsequent user interacts with the separate interactive visual companion element during presentation of the media stream; and scheduling the predicted number of presentations of the media stream to the subsequent user based on the generated predicted number of presentations.

5. The system of claim 1, wherein the media stream comprises at least one of an online audio stream or an online video stream.

6. The system of claim 1, wherein the separate interactive visual companion element comprises a text element.

7. The system of claim 1, wherein the separate interactive visual companion element comprises a banner.

8. The system of claim 1, wherein:

a CTA comprises one or more of:

a prompt for an audience member to click on the separate interactive visual companion element of the media stream for obtaining additional information about a product described in the media stream, and a prompt for the audience member to acquire the product described in the media stream; and information included in a detected user interaction indication comprises at least one of:

an indication of an audience member having clicked on the separate interactive visual companion element of the media stream, an indication of the audience member having acquired a product described in the media stream, and one or more of:

a publisher ID, an audience member ID, and a client computer ID, a time of day, a day of a week, and a month of the streaming of the media stream, and a type of programming associated with the media stream switched by the media stream, wherein the type of programming comprises a genre of music of a radio stream.

9. A method performed by a data processing apparatus, the method comprising:

streaming a media stream to one or more of a plurality of client computers, wherein the media stream does not include a mechanism that enables a user to submit a request for additional information about content of the media stream;

presenting, within a media player that is streaming the media stream at the one or more of the plurality of client computers, a separate interactive visual companion element that is presented in a different panel of the media player than the media stream and that initiates a request for additional information about the content of the media stream when user interaction with the separate interactive visual companion element occurs;

during the streaming of the media stream, detecting user interaction with the separate interactive visual companion element in the different panel indicating direct feedback that a user is requesting additional information about the content of the media stream;

logging an indication of the user interaction with the separate interactive visual companion element in the different panel; and directing the given client computer to a web page for a provider of the media stream in response to the indication of the user interaction with the separate interactive visual companion element in the different panel.

10. The method of claim 9, wherein access to the additional information is not available to the user via the media stream.

11. The method of claim 9, further comprising:

accessing a cookie stored at a given client computer among the one or more client computers, wherein the cookie stores information identifying how many times the media stream has been played at the given client computer; and logging, in a log that maintains a count of media stream presentations, how many times the media stream was presented by the media player to a user of the given client computer using the cookie stored at the given client computer.

12. The method of claim 11, further comprising:

generating, using machine learning techniques applied to the logged indication of the user interaction and the count of the media stream presentations when the user interaction was detected, a predicted number of presentations of the media stream to a subsequent user that will occur before the subsequent user interacts with the separate interactive visual companion element during presentation of the media stream; and scheduling the predicted number of presentations of the media stream to the subsequent user based on the generated predicted number of presentations.

13. The method of claim 9, wherein the media stream comprises at least one of an online audio stream or an online video stream.

14. The method of claim 9, wherein the separate interactive visual companion element comprises a text element.

15. The method of claim 9, wherein the separate interactive visual companion element comprises a banner.

16. A non-transitory computer storage medium encoded with a computer program, the computer program comprising instructions that when executed by a data processing apparatus cause the data processing apparatus to perform operations comprising:

streaming a media stream to one or more of a plurality of client computers, wherein the media stream does not include a mechanism that enables a user to submit a request for additional information about content of the media stream;

presenting, within a media player that is streaming the media stream at the one or more of the plurality of client computers, a separate interactive visual companion element that is presented in a different panel of the media player than the media stream and that initiates a request for additional information about the content of the media stream when user interaction with the separate interactive visual companion element occurs;

during the streaming of the media stream, detecting user interaction with the separate interactive visual companion element in the different panel indicating direct feedback that a user is requesting additional information about the content of the media stream;

logging an indication of the user interaction with the separate interactive visual companion element in the different panel; and directing the given client computer to a web page for a provider of the media stream in response to the indication of the user interaction with the separate interactive visual companion element in the different panel.

17. The non-transitory computer storage medium of claim 16, wherein access to the additional information is not available to the user via the media stream.

18. The non-transitory computer storage medium of claim 16, wherein the instructions cause the data processing apparatus to perform operations comprising:

accessing a cookie stored at a given client computer among the one or more client computers, wherein the cookie stores information identifying how many times the media stream has been played at the given client computer; and logging, in a log that maintains a count of media stream presentations, how many times the media stream was presented by the media player to a user of the given client computer using the cookie stored at the given client computer.

19. The non-transitory computer storage medium of claim 18, wherein the instructions cause the data processing apparatus to perform operations comprising:

generating, using machine learning techniques applied to the logged indication of the user interaction and the count of the media stream presentations when the user interaction was detected, a predicted number of presentations of the media stream to a subsequent user that will occur before the subsequent user interacts with the separate interactive visual companion element during presentation of the media stream; and scheduling the predicted number of presentations of the media stream to the subsequent user based on the generated predicted number of presentations.

20. The non-transitory computer storage medium of claim 16, wherein the media stream comprises at least one of an online audio stream or an online video stream.

* * * * *